(12) United States Patent
Sun et al.

(10) Patent No.: US 10,785,793 B2
(45) Date of Patent: *Sep. 22, 2020

(54) METHOD AND APPARATUS FOR SCHEDULING MULTIPLE UPLINK GRANTS OF DIFFERENT TYPES

(71) Applicant: QUALCOMM Incorporated, San Diego, CA (US)

(72) Inventors: Haitong Sun, Cupertino, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,252

(22) Filed: May 15, 2019

(65) Prior Publication Data

US 2019/0268936 A1 Aug. 29, 2019

Related U.S. Application Data

(63) Continuation of application No. 15/458,915, filed on Mar. 14, 2017, now Pat. No. 10,342,038.

(60) Provisional application No. 62/404,165, filed on Oct. 4, 2016.

(51) Int. Cl.
*H04W 72/14* (2009.01)
*H04W 72/04* (2009.01)
*H04W 72/12* (2009.01)

(52) U.S. Cl.
CPC ......... *H04W 72/14* (2013.01); *H04W 72/042* (2013.01); *H04W 72/0406* (2013.01); *H04W 72/0446* (2013.01); *H04W 72/1289* (2013.01)

(58) Field of Classification Search
None
See application file for complete search history.

(56) References Cited

U.S. PATENT DOCUMENTS

| 10,342,038 | B2 * | 7/2019 | Sun ............... H04W 72/0406 |
| 2011/0164584 | A1 | 7/2011 | Seo et al. |
| 2014/0323171 | A1 | 10/2014 | Xiong |
| 2015/0103703 | A1 | 4/2015 | Zeng et al. |

(Continued)

OTHER PUBLICATIONS

"3rd Generation Partnership Project; Technical Specification Group Radio Access Network; Study on LTE-based V2X Services; (Release 14)", 3GPP Standard; 3GPP TR 36.885, 3rd Generation Partnership Project (3GPP), Mobile Competence Centre, 650, Route Des Lucioles, F-06921, Sophia-Antipolis Cedex, France, vol. RAN WG1, No. V14.0.0, Jul. 20, 2016, pp. 1-216, XP051295325, [retrieved on Jul. 20, 2016].

(Continued)

*Primary Examiner* — Alex Skripnikov
(74) *Attorney, Agent, or Firm* — Loza & Loza, LLP

(57) ABSTRACT

Aspects of the present disclosure provide for scheduling multiple types of uplink grants for a single user equipment to support different types of service with different traffic patterns and quality of service (QoS) requirements. In some aspects of the disclosure, the user equipment may be configured with uplink grants for different types of semi-persistent scheduling, along with a dynamic uplink grant. In some examples, the different types of semi-persistent scheduling may include dedicated semi-persistent scheduling and contention-based semi-persistent scheduling.

30 Claims, 16 Drawing Sheets

(56) References Cited

U.S. PATENT DOCUMENTS

| | | | |
|---|---|---|---|
| 2015/0103749 A1 | 4/2015 | Kela et al. | |
| 2015/0282210 A1 | 10/2015 | Li et al. | |
| 2016/0150490 A1 | 5/2016 | Ouchi et al. | |
| 2017/0289733 A1* | 10/2017 | Rajagopal | H04L 67/12 |

OTHER PUBLICATIONS

International Search Report and Written Opinion—PCT/US2017/054568—ISA/EPO—dated Jan. 3, 2018.
NTT DOCOMO et al., "(E)PDCCH for Sidelink SPS Configuration Switching", 3GPP Draft; R1-165193, 3rd Generation Partnership Project (3GPP), Mobile Competence Centre, 650, Route Des Lucioles, F-06921, Sophia-Antipolis Cedex, France, vol. Ran WG1, No. Nanjing, China; May 14, 2016, XP051096220, Retrieved from the Internet: URL:http://www.3gpp.org/ftp/tsg_ran/WG1_RL1/TSGR1_85/Docs/ [retrieved on May 14, 2016], 5 pages.
Qualcomm Incorporated: "Details of DCI and SPS Configuration", 3GPP Draft; R2-166721_SPS_V2X, 3rd Generation Partnership Project (3GPP), Mobile Competence Centre, 650, Route Des Lucioles, F-06921, Sophia-Antipolis Cedex, France, vol. RAN WG2, No. Kaohsuing; Sep. 30, 2016, XP051161893, Retrieved from the Internet: URL:http://www.3gpp.org/ftp/tsg_ran/WG2_RL2/TSGR2_95bis/Docs/ [retrieved on Sep. 30, 2016], 4 pages.
Samsung: "UE Reporting and Dynamic SL SPS Transmission", 3GPP Draft; R2-163451, 3rd Generation Partnership Project (3GPP), Mobile Competence Centre, 650, Route Des Lucioles, F-06921, Sophia-Antipolis Cedex, France, vol. RAN WG2, No. Nanjing, China; May 22, 2016, XP051104952, Retrieved from the Internet: URL:http://www.3gpp.org/ftp/Meetings_3GPP_SYNC/RAN2/Docs/ [retrieved on May 22, 2016], 3 pages.

* cited by examiner

DL-Centric Slot

UL-Centric Slot

METHOD AND APPARATUS FOR SCHEDULING MULTIPLE UPLINK GRANTS OF DIFFERENT TYPES

PRIORITY CLAIM

The present Application for Patent is a Continuation of Non-Provisional application Ser. No. 15/458,915 filed in the U.S. Patent and Trademark Office on Mar. 14, 2017, the entire content of which is incorporated herein by reference as if fully set forth below in its entirety and for all applicable purposes. Non-Provisional application Ser. No. 15/458,915 claims priority to and the benefit of Provisional Patent Application No. 62/404,165 filed in the U.S. Patent and Trademark Office on Oct. 4, 2016, the entire content of which is incorporated herein by reference as if fully set forth below in its entirety and for all applicable purposes

TECHNICAL FIELD

The technology discussed below relates generally to wireless communication systems, and more particularly, to scheduling resources on the uplink. Embodiments can provide and enable techniques to schedule multiple uplink grants of different types in next generation (5G) wireless networks.

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH).

A common form of scheduling utilized in wireless networks is dynamic scheduling, where resources are scheduled when data is available to be transmitted. For example, in the downlink (e.g., from the base station to the UE), resources may be assigned when the base station has data to send to the UE. In the uplink (e.g., from the UE to the base station), the UE may transmit a scheduling request to the base station when data arrives in the UE's uplink buffer.

While dynamic scheduling works well for bursty, infrequent, or bandwidth consuming transmissions, dynamic scheduling is less ideal for low-latency or periodic transmissions due to the delay and overhead requirements involved with dynamic scheduling. Therefore, another type of scheduling, known as semi-persistent scheduling, has been developed to reduce scheduling overhead and to support low-latency transmissions. With semi-persistent scheduling (SPS), the UE is pre-configured by the base station with a periodicity of downlink assignments or uplink grants. Once configured, the UE may receive downlink transmissions at regular intervals or transmit uplink transmissions at regular intervals according to the periodicity. During SPS, the resource assignments and modulation and coding scheme may remain fixed for each transmission.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to scheduling different types of uplink grants for a user equipment (scheduled entity) in order to support different types of service with different traffic patterns and quality of service (QoS) requirements. In some aspects of the disclosure, the scheduled entity may be configured with uplink grants for different types of semi-persistent scheduling, along with a dynamic uplink grant. In some examples, the different types of semi-persistent scheduling may include dedicated semi-persistent scheduling and contention-based semi-persistent scheduling.

In one aspect of the disclosure, a method of wireless communication in a wireless communication network for a scheduling entity to communicate with a set of one or more scheduled entities is disclosed. The method includes allocating a first set of resource elements for use by a scheduled entity of the set of one or more scheduled entities in accordance with a first uplink grant of a first type of semi-persistent scheduling, allocating a second set of resource elements for use by the scheduled entity in accordance with a second uplink grant of a second type of semi-persistent scheduling, and allocating a third set of resource elements for use by the scheduled entity in accordance with a third uplink grant, where the third uplink grant is a dynamic scheduling grant. The method further includes transmitting scheduling information corresponding to the first uplink grant, the second uplink grant and the third uplink grant to the scheduled entity such that the scheduled entity is simultaneously configured with the first uplink grant, the second uplink grant, and the third uplink grant.

Another aspect of the disclosure provides a scheduling entity in a wireless communication network. The scheduling entity includes a processor, a transceiver communicatively coupled to the processor and a memory communicatively coupled to the processor. The processor is configured to allocate a first set of resource elements for use by a scheduled entity of the set of one or more scheduled entities in accordance with a first uplink grant of a first type of semi-persistent scheduling, allocate a second set of resource elements for use by the scheduled entity in accordance with a second uplink grant of a second type of semi-persistent scheduling, and allocate a third set of resource elements for use by the scheduled entity in accordance with a third uplink grant, where the third uplink grant is a dynamic scheduling grant. The processor is further configured to transmit via the transceiver scheduling information corresponding to the first uplink grant, the second uplink grant and the third uplink grant to the scheduled entity such that the scheduled entity is simultaneously configured with the first uplink grant, the second uplink grant, and the third uplink grant.

Examples of additional aspects of the disclosure follow. In some aspects of the disclosure, the first type of semi-persistent scheduling includes dedicated semi-persistent scheduling and the second type of semi-persistent scheduling includes contention-based semi-persistent scheduling. In some aspects of the disclosure, the method further includes configuring the scheduled entity with first semi-persistent scheduling configuration parameters for the first uplink grant, activating the first type of semi-persistent scheduling for the scheduled entity to enable the scheduled entity to utilize the first uplink grant based on the first semi-persistent scheduling configuration parameters, configuring the scheduled entity with second semi-persistent scheduling configuration parameters for the second uplink grant, and activating the second type of semi-persistent scheduling to enable the scheduled entity to utilize the second uplink grant based on the second semi-persistent scheduling configuration parameters. In some examples, the first type of semi-persistent scheduling is activated substantially simultaneously to activating the second type of semi-persistent scheduling. In other examples, the first and second types of semi-persistent scheduling are activated at different times.

In some aspects of the disclosure, the first semi-persistent scheduling configuration parameters include at least a first semi-persistent scheduling identifier and a first periodicity of the first uplink grant, the second semi-persistent scheduling configuration parameters include at least a second semi-persistent scheduling identifier and a second periodicity of the second uplink grant, and the scheduling information includes the first semi-persistent scheduling configuration parameters and the second semi-persistent scheduling configuration parameters.

In some aspects of the disclosure, the method further includes releasing the first type of semi-persistent scheduling for the scheduled entity to deactivate the first uplink grant, and releasing the second type of semi-persistent scheduling for the scheduled entity to deactivate the second uplink grant. In some examples, the first type of semi-persistent scheduling is released substantially simultaneously to the second type of semi-persistent scheduling. In other examples, the first and second types of semi-persistent scheduling are leased at different times.

In some aspects of the disclosure, at least one of the first uplink grant or the second uplink grant is configured based on a traffic type of user data traffic to be sent by the scheduling entity. In some aspects of the disclosure, at least one of the first uplink grant or the second uplink grant is configured based on a quality of service to be provided to the scheduled entity.

In some aspects of the disclosure, the first set of resource elements are orthogonal to the second set of resource elements. In some aspects of the disclosure, the first and second sets of resource elements at least partially overlap in at least one of time or frequency. In some aspects of the disclosure, the scheduling information for each of the first, second, and third uplink grants are transmitted within separate downlink channel information of a physical downlink control channel.

In some aspects of the disclosure, the scheduling entity is a base station and the scheduled entity is a user equipment. In some aspects of the disclosure, the method further includes receiving user data traffic from the user equipment on at least one of the first set of resource elements, the second set of resource elements or the third set of resource elements.

Another aspect of the disclosure provides a method for a scheduled entity to communicate with a scheduling entity. The method includes receiving scheduling information corresponding to a first uplink grant, a second uplink grant, and a third uplink grant to simultaneously configure the scheduled entity with the first uplink grant, the second uplink grant, and the third uplink grant. The first uplink grant includes a first type of semi-persistent scheduling, the second uplink grant includes a second type of semi-persistent scheduling, and the third uplink grant includes a dynamic scheduling grant. The method further includes identifying user data traffic to be transmitted from the scheduled entity to the scheduling entity, selecting one or more selected uplink grants from the first uplink grant, the second uplink, or the third uplink grant for the user data traffic, and transmitting the user data traffic from the scheduled entity to the scheduling entity utilizing the one or more selected uplink grants.

Another aspect of the disclosure provides a scheduled entity in a wireless communication network. The scheduled entity includes a processor, a transceiver communicatively coupled to the processor, and a memory communicatively coupled to the processor. The processor is configured to receive scheduling information corresponding to a first uplink grant, a second uplink grant, and a third uplink grant to simultaneously configure the scheduled entity with the first uplink grant, the second uplink grant, and the third uplink grant. The first uplink grant includes a first type of semi-persistent scheduling, the second uplink grant includes a second type of semi-persistent scheduling, and the third uplink grant includes a dynamic scheduling grant. The processor is further configured to identify user data traffic to be transmitted from the scheduled entity to the scheduling entity, select one or more selected uplink grants from the first uplink grant, the second uplink, or the third uplink grant for the user data traffic, and transmit the user data traffic from the scheduled entity to the scheduling entity utilizing the one or more selected uplink grants.

Examples of additional aspects of the disclosure follow. In some aspects of the disclosure, the first type of semi-persistent scheduling includes dedicated semi-persistent scheduling and the second type of semi-persistent scheduling includes contention-based semi-persistent scheduling. In some aspects of the disclosure, a respective uplink transmit power may be selected for each of the one or more selected uplink grants.

In some aspects of the disclosure, the one or more selected uplink grants may be selected based on a traffic type of the user data traffic. In some examples, the first uplink grant may be selected as one of the one or more selected uplink grants when the user data traffic includes periodic traffic, the second uplink grant may be selected as one of the one or more selected uplink grants when the user data traffic includes low-latency traffic or small packet-sized traffic, and the third uplink grant may be selected as one of the one or more selected uplink grants when the user data traffic includes large packet-sized traffic.

In some aspects of the disclosure, the first uplink grant includes a first set of resource elements, the second uplink grant includes a second set of resource elements, and the third uplink grant includes a third set of resource elements. In some examples, the third uplink grant may be selected as one of the one or more selected uplink grants when the third set of resource elements overlaps at least one of the first set of resource elements or the second set of resource elements. In some examples, the first uplink grant may be selected as one of the one or more selected uplink grants when the first set of resource elements overlaps the second set of resource elements and the first set of resource elements does not overlap the third set of resource elements. In some examples, the second uplink grant may be selected as one of the one or more selected uplink grants when the second set of resource elements does not overlap the first set of resource elements or the third set of resource elements.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
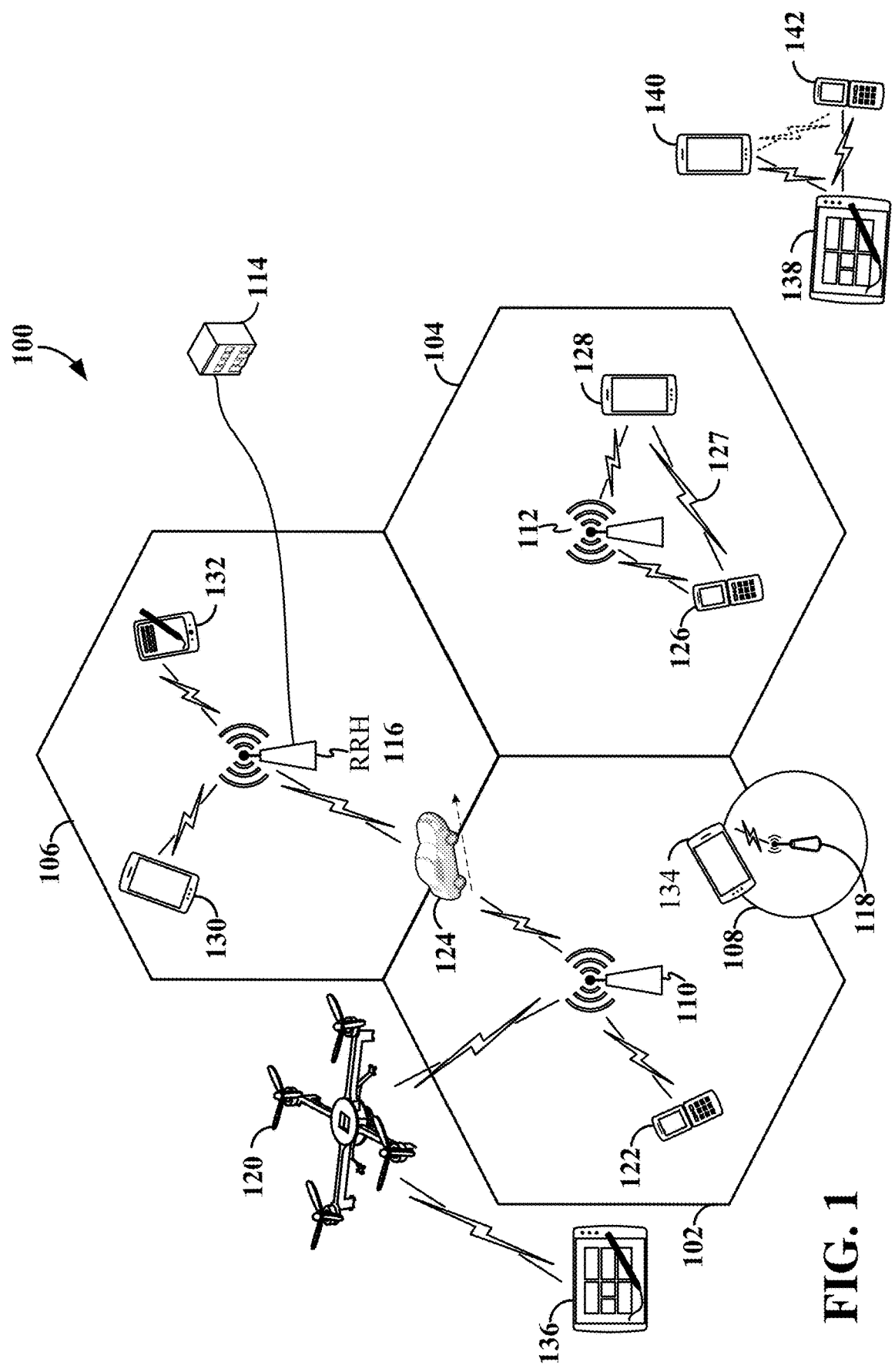
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a legacy access network or a next generation access network. In addition, one or more nodes in the access network 100 may be next generation nodes or legacy nodes.

As used herein, the term legacy access network refers to an access network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network refers to an access network employing a fifth generation (5G) wireless communication technology based on a set of standards that complies with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
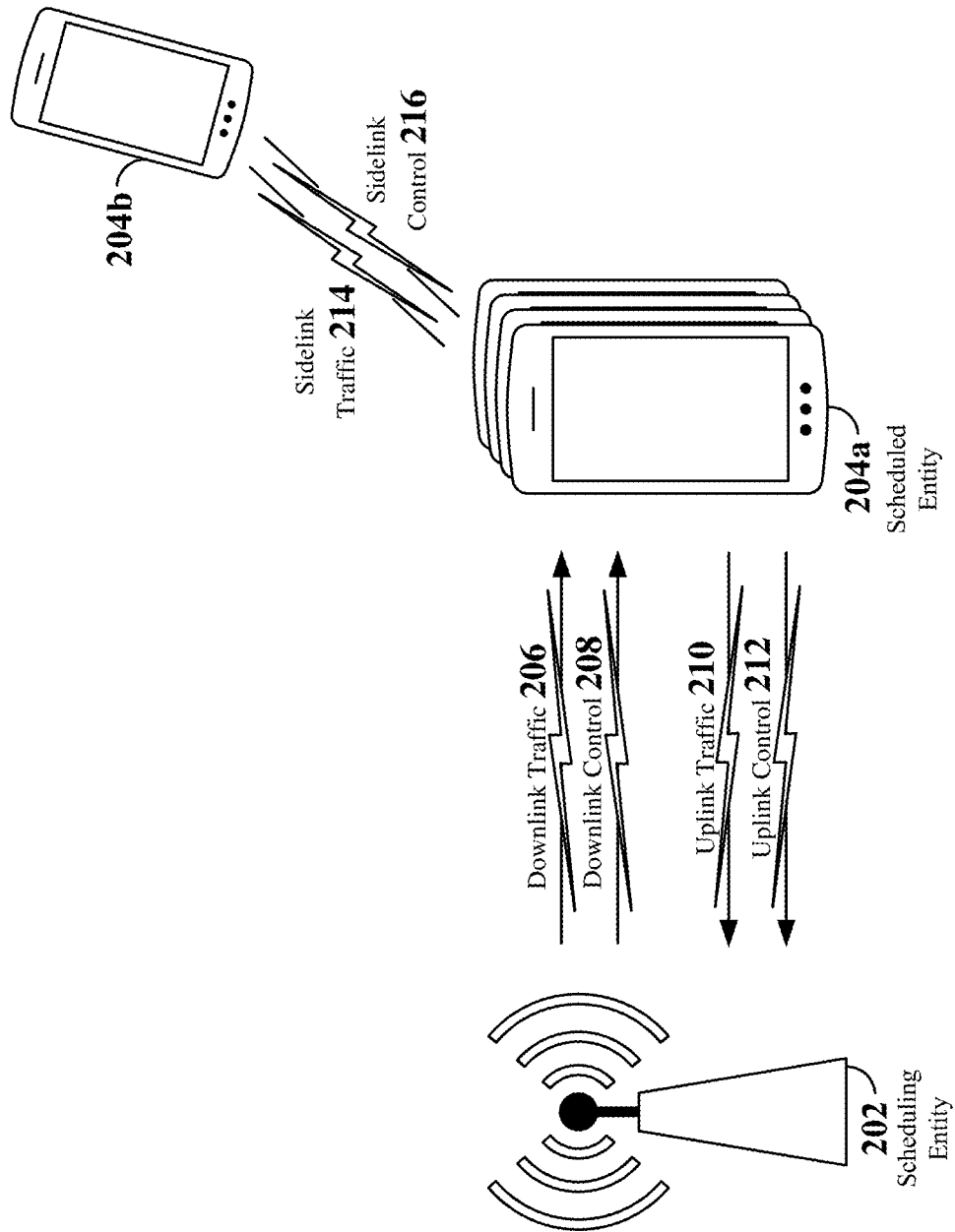
FIG. 2 is a block diagram illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
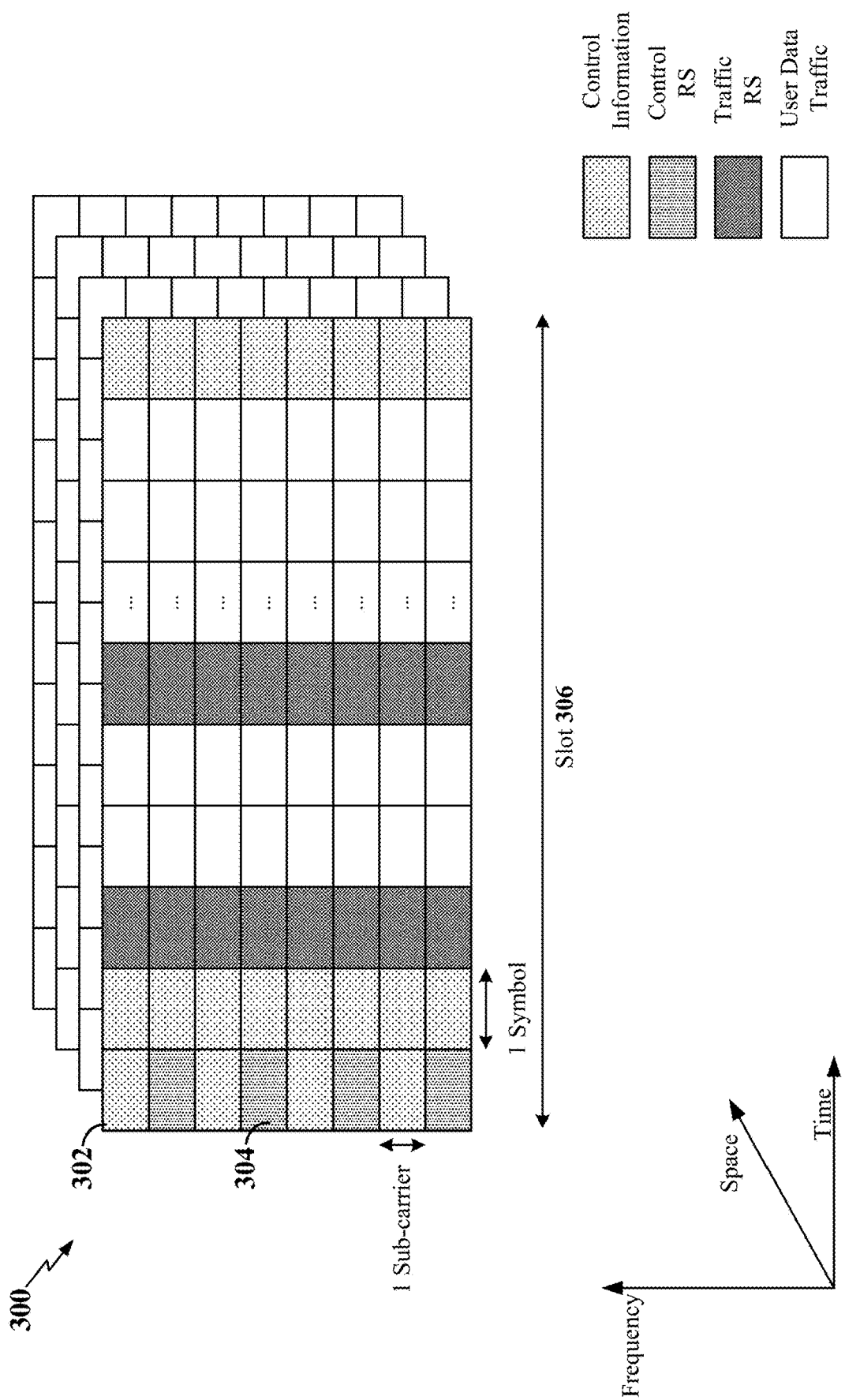
FIG. 3 is a diagram illustrating an example of a resource structure for use in an access network according to some aspects of the present disclosure.

FIG. 3 is a schematic illustration of the resource structure 300 for a radio access network, such as the RAN 100 illustrated in FIG. 1. In some examples, this illustration may represent downlink or uplink wireless resources as they may be allocated in an OFDM system that utilizes MIMO.

The resources in a wireless channel may be characterized according to three dimensions: frequency, space, and time. The frequency and time dimensions of an OFDM system may be represented by a two-dimensional grid 302 of resource elements (REs) 304. The REs 304 are defined by the separation of frequency resources into closely spaced narrowband frequency tones or sub-carriers and the separation of time resources into a sequence of OFDM symbols having a given duration. In the example shown in FIG. 3, each RE 302 is represented by a rectangle having the dimensions of one sub-carrier (e.g., 15 kHz bandwidth) by one OFDM symbol. Thus, each RE 302 represents a sub-carrier modulated for the OFDM symbol period by one OFDM data symbol. Each OFDM symbol may be modulated using, for example, quadrature phase shift keying (QPSK), 16 quadrature amplitude modulation (QAM) or 64 QAM. Further, by utilizing spatial multiplexing (e.g., with MIMO), a plurality of OFDM streams are represented by separate OFDM resource grids 302 spanning in the space dimension of FIG. 3.

The REs 304 may further be grouped into resource blocks. For example, in LTE networks, a resource block includes 12 consecutive sub-carriers in the frequency domain and, for a normal cyclic prefix in each OFDM symbol, 7 consecutive OFDM symbols in the time domain, or 84 resource elements. However, it should be understood that any suitable number of REs 304 may be grouped into a resource block.

In addition, any number of resource blocks (e.g., groups of sub-carriers and OFDM symbols) may be utilized within a subframe or slot. In the illustrated example shown in FIG. 3, the resource structure 300 represents a portion of a slot 306, which may be, for example, a downlink-centric slot or an uplink-centric slot. A DL-centric slot is referred to as a DL-centric slot because a majority (or, in some examples, a substantial portion) of the slot includes DL data. An UL-centric slot is referred to as a UL-centric slot because a majority (or, in some examples, a substantial portion) of the slot includes UL data.

In a given DL-centric or UL-centric slot 306, transmission of one or more downlink control channels may be followed by transmission of one or more downlink or uplink traffic channels, in the time dimension. In general, the first N OFDM symbols in a DL-centric or UL-centric slot typically correspond to a downlink control region (DL burst) of the slot that carries downlink control reference signals and downlink control information, such as the Physical Control Format Indicator Channel (PCFICH), which carries the Control Format Indicator (CFI), the Physical Hybrid Automatic Repeat Request (HARQ) Indicator Channel (PHICH), and the Physical Downlink Control Channel (PDCCH), which carries Downlink Control Information (DCI).

In the non-limiting example illustrated in FIG. 3, the first two symbols include downlink control reference signals and downlink control information, which may be the same as the control information 208 and/or 216 described above. Accordingly, these symbols may be referred to as the DL burst. Any suitable region of resources in the time, frequency, and space dimensions may be utilized as a DL burst, not necessarily limited to the first two symbols. Moreover, a DL burst need not necessarily be contiguous, and may be included in one, two, or any suitable number of separate regions.

Following the DL burst, the slot 306 may include a traffic region carrying downlink or uplink traffic reference signals and traffic information, which may be the same as the user data traffic 206, 210, and/or 214 described above. In both the DL burst and traffic region of the illustrated slot, REs that carry reference signals (RS) are interleaved with REs that carry data. These RSs can provide for channel estimation by a receiving device. In addition, one or more of the RSs in the uplink or downlink may include a demodulation reference signal (DMRS), which may be used to enable coherent signal demodulation at the receiver. In some examples, the DMRS may be transmitted from a scheduled entity to a scheduling entity at the beginning of the traffic region in an UL-centric slot to enable the scheduling entity to demodulate the subsequently transmitted uplink user data traffic.

At the end of the traffic region, the slot 306 may include an uplink (UL) burst that carries uplink control information. For example, the uplink burst may include a physical uplink control channel (PUCCH), physical random access channel (PRACH) or other suitable uplink control information. In the non-limiting example illustrated in FIG. 3, the last symbol in the slot includes the uplink control information, which may be the same as the control information 212 and/or 216 described above. While the above description only refers to the front resource grid (i.e., not considering the space dimension), it is to be understood that control and traffic information for a plurality of users may be multiplexed in space, frequency, and time.

Figure 4:
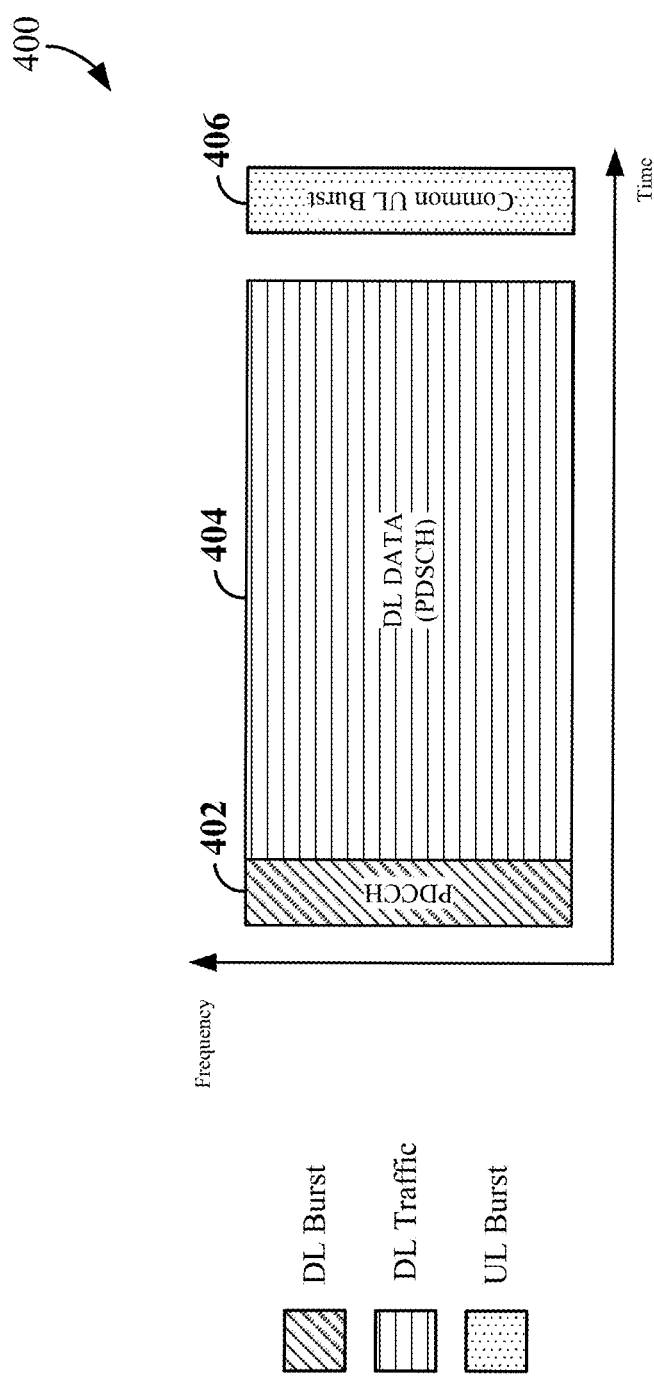
FIG. 4 is a diagram illustrating an example of a downlink (DL)-centric slot according to some aspects of the present disclosure.

FIG. 4 is a diagram illustrating an example of a downlink (DL)-centric slot 400 according to some aspects of the disclosure. In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 202 (e.g., eNB) to the scheduled entity 204 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the control portion 402 and/or DL traffic region 404. Non-limiting examples of feedback information may include an ACK signal, a NACK signal, a HARQ indicator, and/or various other suitable types of information. The UL burst 406 may include additional or alternative information, such as information pertaining to random access channel (RACH) procedures, scheduling requests (SRs) (e.g., within a PUCCH), and various other suitable types of information.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

Figure 5:
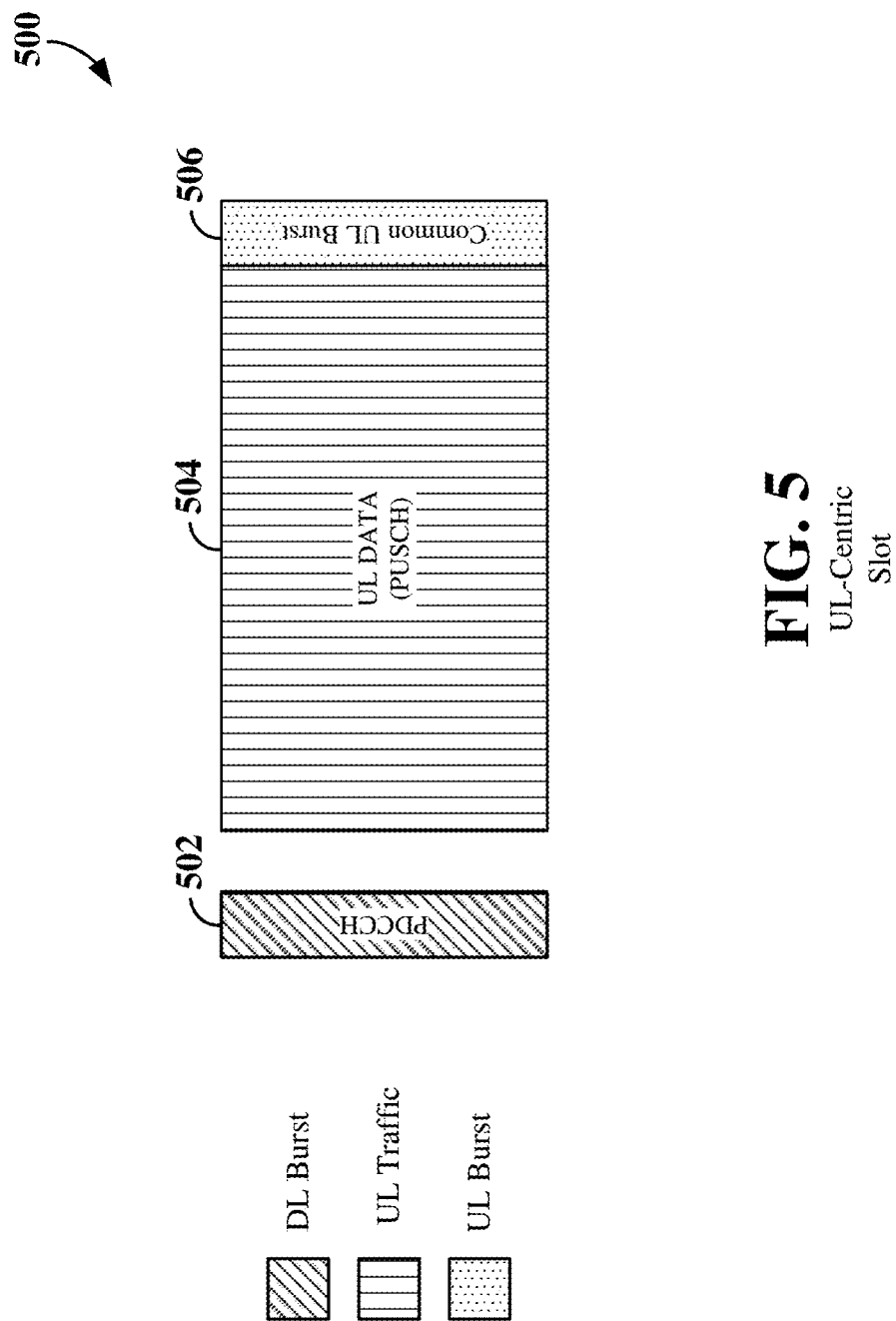
FIG. 5 is a diagram illustrating an example of an uplink (UL)-centric slot according to some aspects of the present disclosure.

FIG. 5 is a diagram showing an example of an uplink (UL)-centric slot 500 according to some aspects of the disclosure. In the example shown in FIG. 5, time is illustrated along a horizontal axis, while frequency is illustrated along a vertical axis. The time-frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 204 (e.g., UE) to the scheduling entity 202 (e.g., eNB). In some configurations, the UL traffic region 504 may be a physical UL shared channel (PUSCH). As illustrated in FIG. 5, the end of the DL burst 502 may be separated in time from the beginning of the UL traffic region 504. This time, separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)).

The UL burst 506 in FIG. 5 may be similar to the UL burst 406 described above with reference to FIG. 4. The UL burst 506 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

Figure 6:
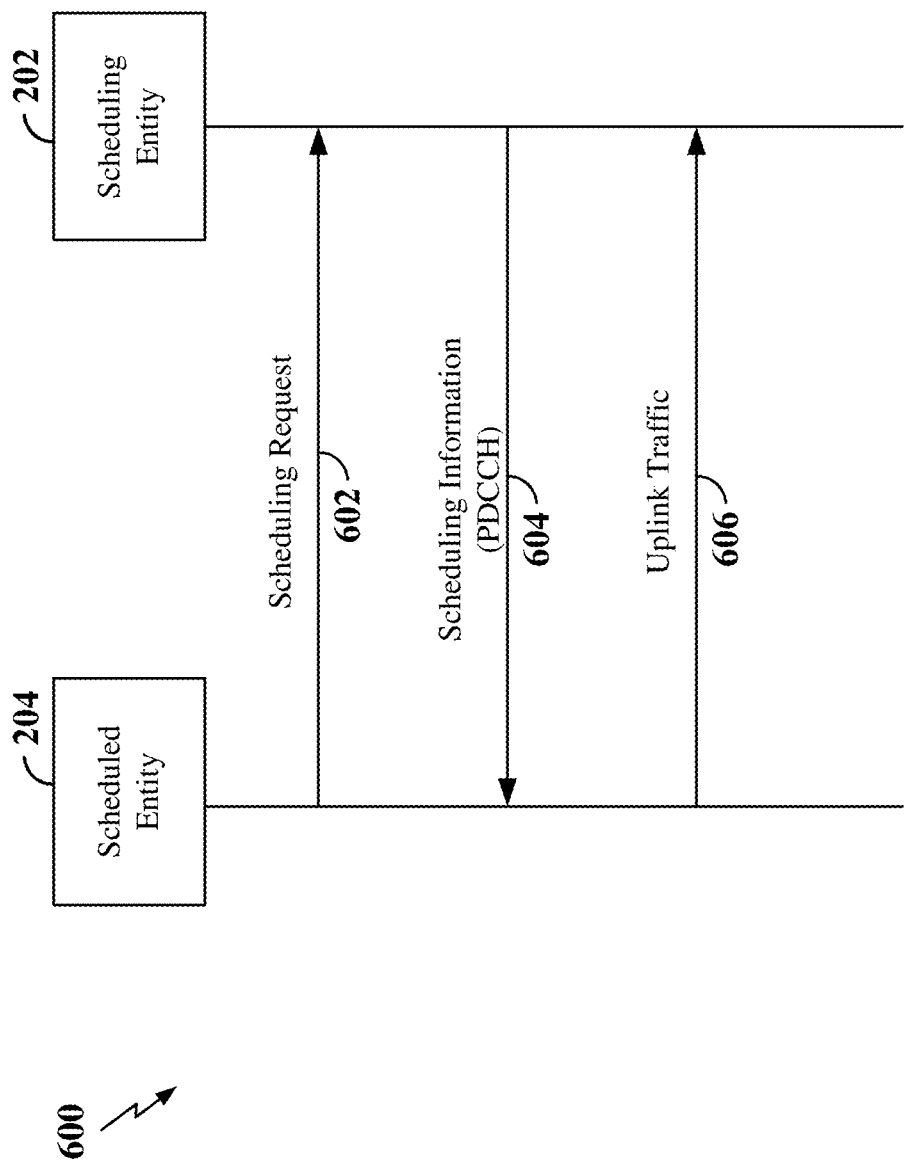
FIG. 6 is a signaling diagram illustrating exemplary signaling for dynamic scheduling according to some aspects of the present disclosure.

Scheduling of uplink resources (e.g., resource elements/resource blocks) for use by scheduled entities to transmit control and/or traffic information may be performed in a dynamic manner or a semi-persistent manner. FIG. 6 is a signaling diagram 600 illustrating exemplary signaling for dynamic scheduling according to some aspects of the present disclosure. When data arrives in an uplink buffer of a scheduled entity 204, at 602, the scheduled entity 204 may transmit a scheduling request to the scheduling entity 202 to request an uplink grant of time-frequency resources (e.g., resource elements/resource blocks) for the scheduled entity 204 to transmit the data to the scheduled entity 202. The scheduling request may be transmitted, for example, via the PUCCH within an UL burst of a DL-centric slot or an UL-centric slot.

In response to the scheduling request, the scheduling entity 204 may allocate a set of one or more resource elements (e.g. which may correspond to one or more resource blocks) to the scheduled entity 204, and at 604, transmit scheduling information corresponding to the uplink grant (e.g., information indicative of the assigned resource elements) to the scheduled entity 204. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. At 606, the scheduled entity 204 may then utilize the assigned uplink resource element(s) to transmit the data (traffic) to the scheduling entity 202. The assigned uplink resources for the traffic may be within the same slot as the PDCCH (e.g., when the PDCCH is transmitted in an UL-centric slot) or within a subsequent slot (e.g., when the PDCCH is transmitted in a DL-centric slot).

Figure 7:
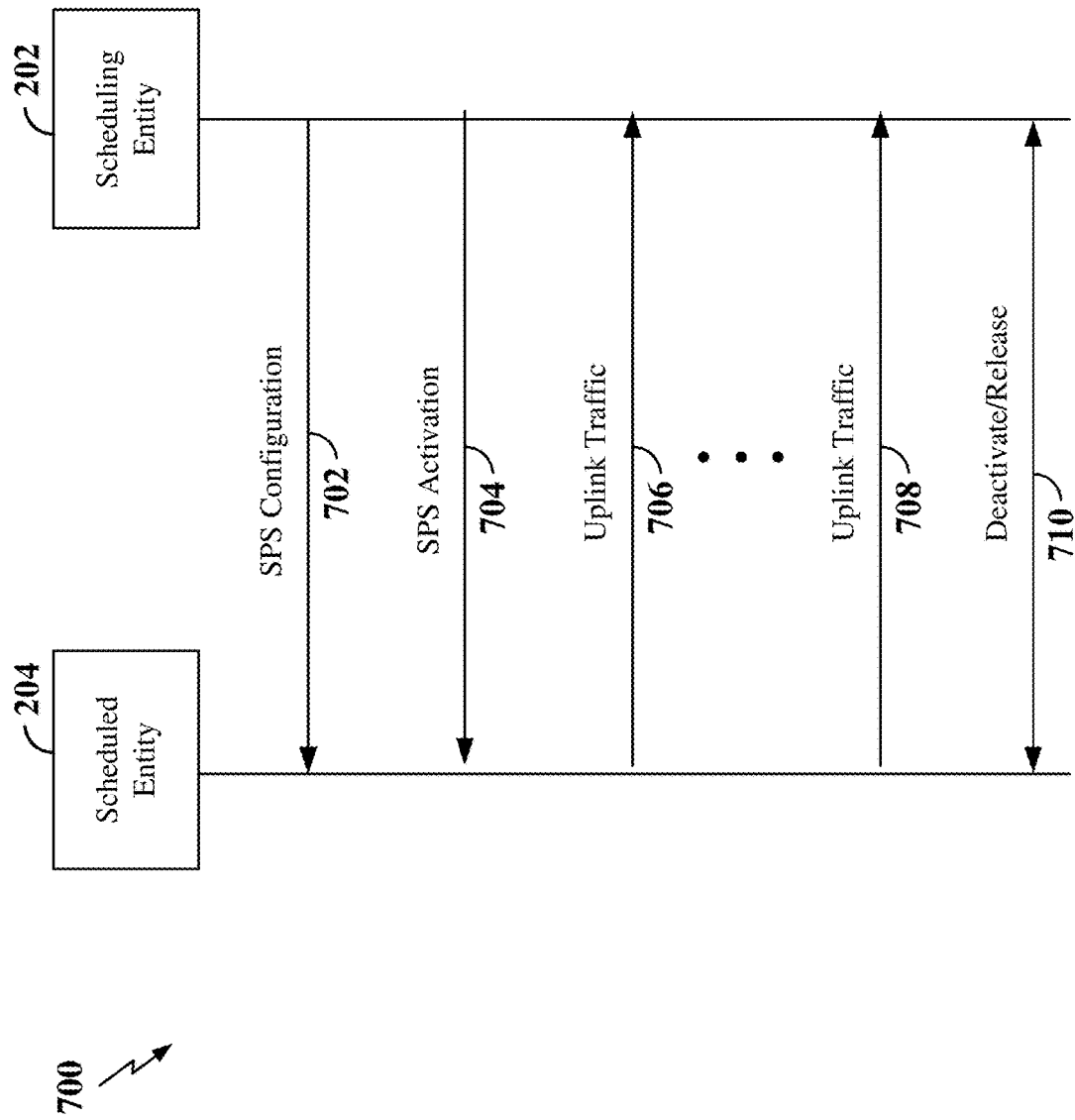
FIG. 7 is a signaling diagram illustrating exemplary signaling for semi-persistent scheduling according to some aspects of the present disclosure.

FIG. 7 is a signaling diagram 700 illustrating exemplary signaling for semi-persistent scheduling (SPS) according to some aspects of the present disclosure. Generally, SPS may be used for periodic communications based on defined settings. For example, SPS may be suitable for applications with small, predictable, and/or periodic payloads, such as voice over Internet protocol (VoIP) applications. To avoid overwhelming the PDCCH, scheduling information corresponding to an uplink grant may be signaled just once on the PDCCH. Subsequently, without needing to receive additional scheduling information, the scheduled entity 204 may periodically utilize the resources allocated in the uplink grant. The periodicity with which the scheduled entity 204 may transmit user data traffic via the semi-persistently scheduled resources may be established when the SPS uplink grant is initially configured.

With reference to the diagram illustrated in FIG. 7, at 702, the scheduling entity 202 may configure SPS for a scheduled entity 204 and transmit scheduling information containing SPS configuration parameters to the scheduled entity 204. The SPS configuration message including the scheduling information may be transmitted, for example, via the PDCCH within a DL burst of a DL-centric slot or an UL-centric slot. The SPS configuration parameters may include, for example, an indication of the allocated resources for the SPS uplink grant, a semi-persistent scheduling identifier (e.g., an SPS-RNTI) for the scheduled entity 204 and a periodicity of the SPS uplink grant. The SPS-RNTI may be assigned by the scheduling entity 202 and utilized to scramble subsequent transmissions related to the SPS uplink grant. Additional SPS configuration parameters may also include, but are not limited to, an implicit release time, cyclic shift DMRS configuration, modulation and coding scheme (MCS) and/or other parameters.

The scheduling entity may configure the SPS grant at any time based on the service requirements of the scheduled entity 204 or in response to a request by the scheduled entity 204. For example, the scheduling entity 202 may configure the SPS grant based on the Quality of Service (QoS) to be provided to the scheduled entity and/or a type of traffic to be sent by the scheduling entity. In some examples, the scheduling entity 202 may configure the SPS uplink grant upon dedicated bearer establishment for a VoIP service. As another example, the scheduling entity 202 may configure the SPS uplink grant to meet a low-latency QoS requirement for one or more uplink packets. SPS may be configured, for example, via a radio resource control (RRC) protocol.

Once configured, in order to begin using the SPS uplink grant, at 704, the scheduling entity 204 may then transmit an SPS activation message scrambled with the SPS-RNTI to the scheduled entity 204 to activate the SPS uplink grant and enable the scheduled entity 204 to utilize the SPS uplink grant based on the SPS configuration parameters. The SPS activation message may be transmitted, for example, via the PDCCH within a DL burst of a DL-centric slot or an UL-centric slot. At 706 and 708, the scheduled entity 204 may then utilize the assigned uplink resources to periodically transmit uplink traffic to the scheduling entity within an UL-centric slot based on the periodicity of the SPS uplink grant. During periods of silence or when a data transfer is complete, at 710, the SPS uplink grant may be deactivated/released. For example, an explicit deactivation/release message may be transmitted from the scheduling entity 202 to the scheduled entity 204. In other examples, the scheduled entity 204 may initiate an inactivity timer with the implicit release time received as part of the SPS configuration parameters, and when the inactivity timer expires, the scheduled entity 204 may release the SPS uplink resources.

While the SPS uplink grant is activated, the allocated uplink resources, MCS and other SPS configuration parameters remain fixed. However, retransmissions (e.g., HARQ retransmissions) may be dynamically scheduled between SPS intervals using the SPS-RNTI. In addition, if the radio link conditions change, a new SPS uplink grant may need to be configured and activated.

In some examples, the SPS uplink grant may be a dedicated SPS uplink grant in which the assigned uplink resources (e.g., the set of one or more resource elements allocated to the SPS uplink grant) and the periodicity associated with the assigned uplink resources are dedicated to the scheduled entity 204. In other examples, the SPS uplink grant may be a contention-based SPS uplink grant in which at least a portion of the assigned uplink resources and the periodicity associated with the assigned uplink resources may be granted to two or more scheduled entities simultaneously. With contention-based SPS, partially or fully overlapping transmissions from two or more scheduled entities may be simultaneously received by the scheduling entity 202, resulting in a collision between the uplink transmissions. To enable the scheduling entity 202 to properly decode each of the overlapping uplink transmissions, each scheduled entity 204 may be configured with a different DMRS (e.g., as indicated in the SPS configuration parameters) that is transmitted together with the uplink traffic. The scheduling entity 202 may then differentiate the traffic from each of the scheduled entities based on the respective DMRS transmitted by each of the scheduled entities.

In some examples, a contention-based SPS uplink grant may be utilized to support low-latency and/or small packets that may not necessarily be periodic in nature. Therefore, with contention-based SPS uplink grants, the scheduled entity 204 may choose whether or not to use the grant. For example, if the scheduled entity 204 does not have any traffic to send during the next time interval corresponding to the contention-based SPS uplink grant, the scheduled entity may not send a packet over the assigned uplink resources. By contrast, with dedicated SPS uplink grants, even when the scheduled entity does not have traffic to send (e.g., during silent periods), the scheduled entity may still need to transmit a packet with no data.

The configuration of each type of uplink grant (e.g., dynamic, dedicated SPS and contention-based SPS) may be based, for example, on the scheduled entity service requirements. For example, to support periodic uplink transmissions, the scheduling entity 202 may configure a dedicated SPS uplink grant for the scheduled entity 204. As another example, to support random packet arrival, with small packet size and/or tight delay constraints, the scheduling entity 202 may configure a contention-based SPS uplink grant for the scheduled entity 204 and other scheduled entities. In addition, to support bursty, infrequent or bandwidth consuming transmissions, the scheduling entity 202 may configure a dynamic uplink grant in response to a scheduling request from the scheduled entity 204.

In accordance with various aspects of the present disclosure, to support the different types of service with different traffic patterns and quality of service (QoS) requirements, a scheduled entity 204 in a next generation (5G) wireless access network may be simultaneously configured with multiple uplink grants of different types. In some examples, a scheduled entity 204 may be simultaneously configured with both a dedicated SPS uplink grant and a contention-based SPS uplink grant, in conjunction with a dynamic uplink grant.

Figure 8:
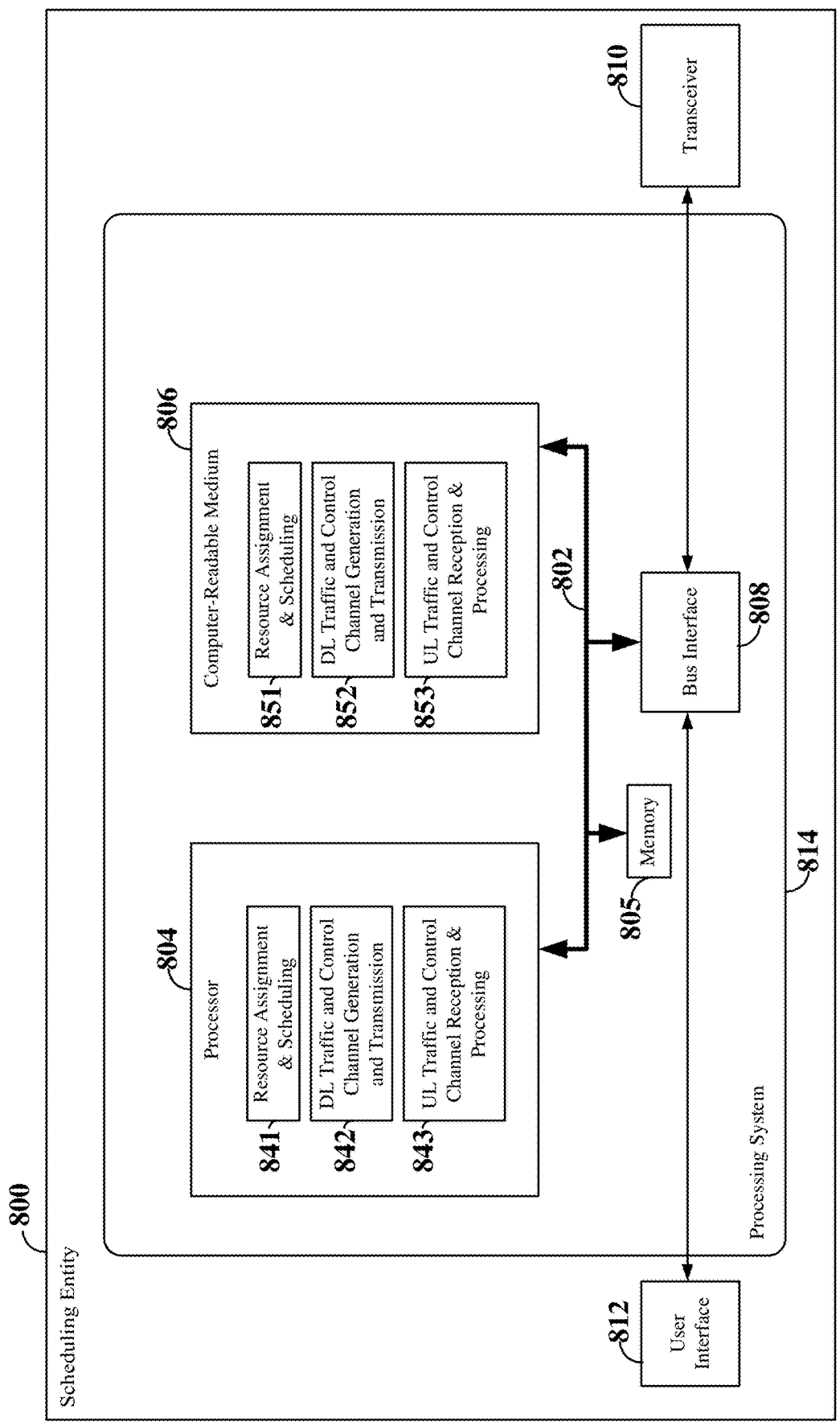
FIG. 8 is a block diagram illustrating an example of a hardware implementation for a scheduling entity employing a processing system according to some aspects of the present disclosure.

FIG. 8 is a conceptual diagram illustrating an example of a hardware implementation for an exemplary scheduling entity 800 employing a processing system 814. For example, the scheduling entity 800 may be a next generation (5G) base station as illustrated in any one or more of FIGS. 1 and 2. In another example, the scheduling entity 800 may be a user equipment (UE) as illustrated in any one or more of FIGS. 1 and 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., air interface). Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 841, configured to generate, schedule, and modify a resource assignment or grant of time-frequency resources (e.g., a set of one or more resource elements). For example, the resource assignment and scheduling circuitry 841 may schedule time-frequency resources within a plurality of time division duplex (TDD) and/or frequency division duplex (FDD) subframes or slots to carry data and/or control information to and/or from multiple UEs (scheduled entities).

In various aspects of the disclosure, the resource assignment and scheduling circuitry 841 may be configured to schedule multiple uplink grants for a single scheduled entity. Each uplink grant may be of a different type to accommodate different service requirements for the scheduled entity. In some examples, the resource assignment and scheduling circuitry 841 may be configured to allocate a first set of resource elements for use by the scheduled entity in accordance with a first uplink grant of a first type of semi-persistent scheduling (SPS) and a second set of resource elements for use by the scheduled entity in accordance with a second uplink grant of a second type of SPS. For example, the first type of SPS may be dedicated SPS, while the second type of SPS may be contention-based SPS. The resource assignment and scheduling circuitry 841 may further be configured to allocate a third set of resource elements for use by the scheduled entity in accordance with a third uplink grant. For example, the third uplink grant may be a dynamic uplink grant.

In some examples, the resource assignment and scheduling circuitry 841 may configure the dynamic uplink grant (e.g., allocate the set of resource elements to the dynamic uplink grant) in response to receiving a scheduling request from the scheduled entity. In addition, the resource assignment and scheduling circuitry 841 may configure each SPS uplink grant at any time based on the service requirements of the scheduled entity or in response to a request by the scheduled entity.

To configure each of the SPS uplink grants, the resource assignment and scheduling circuitry 841 may establish respective SPS configuration parameters for each SPS uplink grant. For example, the SPS configuration parameters for each SPS uplink grant may include an indication of the allocated resources (e.g., set of one or more resource elements) for the SPS uplink grant, a semi-persistent scheduling identifier (e.g., an SPS-RNTI) for the scheduled entity and a periodicity of the SPS uplink grant. Additional SPS configuration parameters may also include, but are not limited to, an implicit release time, cyclic shift DMRS configuration, modulation and coding scheme (MCS) and/or other parameters.

In some examples, the SPS configuration parameters for each of the SPS uplink grants are different (e.g., at least one of the parameters has a different value in each of the SPS uplink grants). For example, the set of resource elements allocated to the first SPS uplink grant may be orthogonal to the set of resource elements allocated to second SPS uplink grant (e.g., the resource elements may be configured in a time division multiplexed (TDM) manner). However, in other examples, one or more of the SPS configuration parameters may be the same between the two SPS uplink grants. For example, the set of resource elements allocated to the first SPS uplink grant may be partially or completely overlapping the set of resource elements allocated to the second SPS grant. In addition, one or more of the MCS, cyclic shift DMRS, implicit release time and periodicity assigned to each of the SPS uplink grants may be the same or different.

In an aspect of the disclosure, the scheduled entity may be simultaneously configured with the first, second and third uplink grants. However, the resource assignment and scheduling circuitry 841 need not configure each of the first, second, and third uplink grants at the same time. For example, the resource assignment and scheduling circuitry 841 may configure the two SPS uplink grants, and during the pendency of the two SPS uplink grants (e.g., before either of the SPS uplink grants have been released), configure the dynamic uplink grant. The two SPS uplink grants may be configured at the same time or at different times, depending on the service requirements of the scheduled entity. The resource assignment and scheduling circuitry 841 may further operate in coordination with resource assignment and scheduling software 851.

The processor 804 may further include downlink (DL) traffic and control channel generation and transmission circuitry 842, configured to generate and transmit downlink user data traffic and control channels within one or more subframes or slots. The DL traffic and control channel generation and transmission circuitry 842 may operate in coordination with the resource assignment and scheduling circuitry 841 to place the DL user data traffic and/or control information onto a time division duplex (TDD) or frequency division duplex (FDD) carrier by including the DL user data traffic and/or control information within one or more subframes or slots in accordance with the resources assigned to the DL user data traffic and/or control information.

For example, the DL traffic and control channel generation and transmission circuitry 842 may be configured to generate a physical downlink control channel (PDCCH) (or Enhanced PDCCH (ePDCCH)) including downlink control information (DCI). In some examples, each DCI may include control information indicating an assignment of downlink resources for downlink user data traffic or a grant of uplink resources for one or more scheduled entities. For example, the DL traffic and control channel generation and transmission circuitry 842 may be configured to include, within separate DCI, scheduling information for multiple uplink grants for a particular scheduled entity. In an example, a first DCI may include SPS configuration parameters associated with a dedicated SPS uplink grant for a scheduled entity, a second DCI may include SPS configuration parameters associated with a contention-based SPS uplink grant for the scheduled entity, and a third DCI may indicate the allocated resources associated with a dynamic uplink grant for the scheduled entity.

In addition, for each of the SPS uplink grants, additional DCI may be generated and transmitted to the scheduled entity, each including an activation of the respective SPS uplink grant to enable the scheduled entity to begin utilizing the SPS uplink grants. In some examples, if a scheduled entity is configured with two SPS uplink grants of different types, the DL data and control channel generation and transmission circuitry may jointly or separately activate the SPS uplink grants. Similarly, additional DCI may also be generated to deactivate/release one or more the SPS uplink grants. In some examples, SPS uplink grants of different types may be jointly or separately deactivated/released.

The DL traffic and control channel generation and transmission circuitry 842 may further be configured to generate a physical downlink shared channel (PDSCH) (or Enhanced PDSCH (ePDSCH)) including downlink user data traffic. The DL traffic and control channel generation and transmission circuitry 842 may further operate in coordination with DL traffic and control channel generation and transmission software 852.

The processor 804 may further include uplink (UL) traffic and control channel reception and processing circuitry 843, configured to receive and process uplink control channels and uplink traffic channels from one or more scheduled entities. For example, the UL traffic and control channel reception and processing circuitry 843 may be configured to receive a dynamic scheduling request or a request for an SPS uplink grant from a scheduled entity. The UL traffic and control channel reception and processing circuitry 843 may further be configured to provide the scheduling request or SPS uplink grant request to the resource assignment and scheduling circuitry 841 for processing.

The UL traffic and control channel reception and processing circuitry 843 may further be configured to receive uplink user data traffic from one or more scheduled entities. In some examples, the UL traffic and control channel reception and processing circuitry 843 may receive user data traffic from a scheduled entity that has multiple uplink grants of different types. In this example, the UL traffic and control channel reception and processing circuitry 843 may receive user data traffic from the scheduled entity on at least one set of resource elements allocated to the scheduled entity. For dynamic uplink grants, the UL traffic and control channel reception and processing circuitry 843 may receive user data traffic from the scheduled entity in accordance with the set of resource elements allocated to the dynamic uplink grant. In some examples, the scheduling information indicating the allocated set of resource elements may be included at the beginning of an UL-centric slot and the scheduled user data traffic may be received by the UL traffic and control channel reception and processing circuitry 843 within the same UL-centric slot.

In addition, if at least one SPS uplink grant is active, the UL traffic and control channel reception and processing circuitry 843 may receive uplink user data traffic from the scheduled entity on the set of resource elements allocated for that SPS uplink grant at periodic intervals determined by the SPS configuration parameters. For a contention-based SPS uplink grant, the UL traffic and control channel reception and processing circuitry 843 may receive overlapping transmissions from two or more scheduled entities on the set of resource elements allocated to the contention-based SPS uplink grant. In some examples, each of the overlapping transmissions includes a different DMRS. Therefore, the UL traffic and control channel reception and processing circuitry 843 may decode each of the overlapping transmissions utilizing the different DMRS.

In general, the UL traffic and control channel reception and processing circuitry 843 may operate in coordination with the resource assignment and scheduling circuitry 841 to schedule UL user data traffic transmissions, DL user data traffic transmissions and/or DL user data traffic retransmissions in accordance with the received UL control information. The UL traffic and control channel reception and processing circuitry 843 may further operate in coordination with UL traffic and control channel reception and processing software 853.

Figure 9:
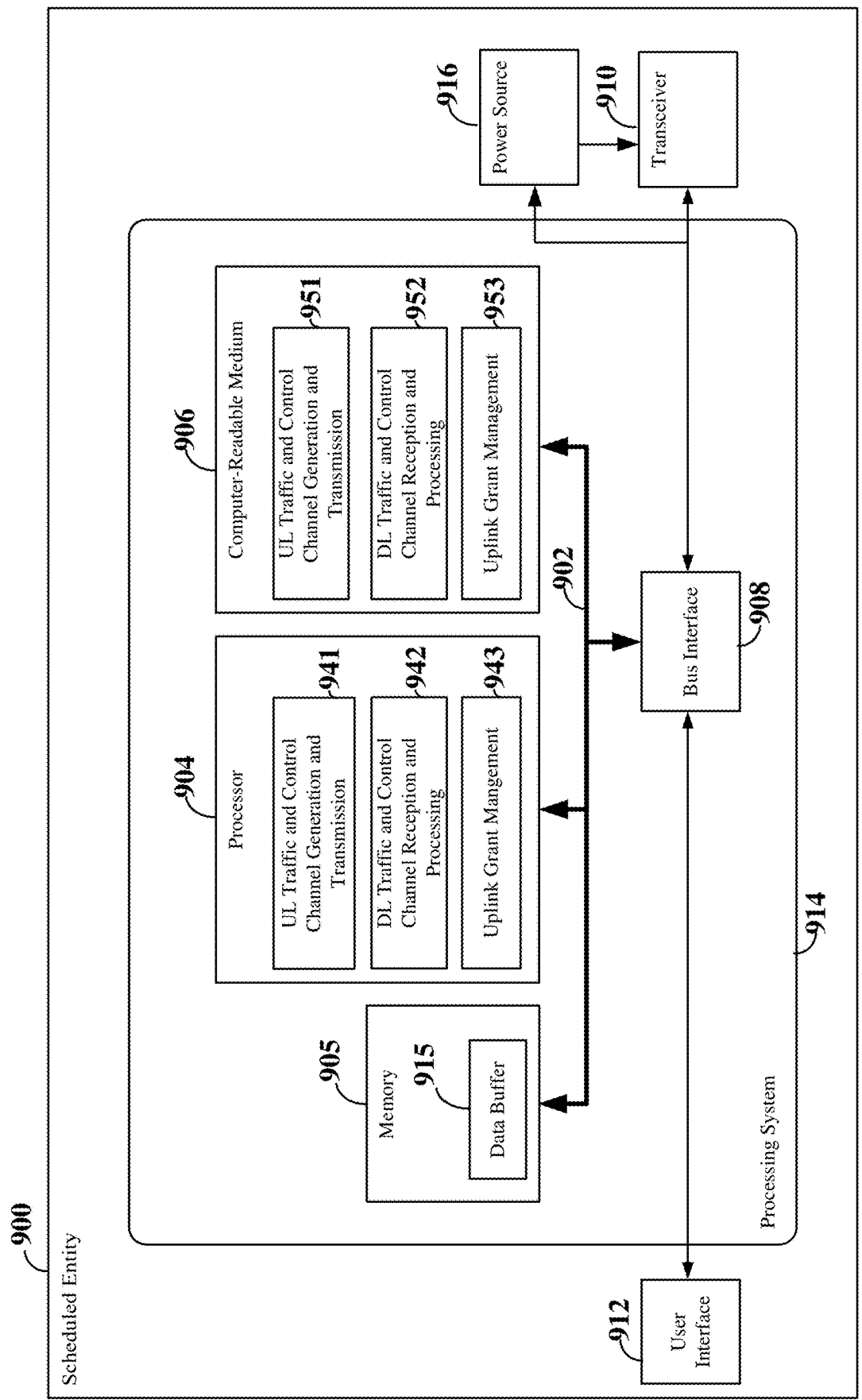
FIG. 9 is a block diagram illustrating an example of a hardware implementation for a scheduled entity employing a processing system according to some aspects of the present disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1 and 2.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below.

In some aspects of the disclosure, the processor 904 may include uplink (UL) traffic and control channel generation and transmission circuitry 941, configured to generate and transmit uplink control/feedback/acknowledgement information on an UL control channel. For example, the UL traffic and control channel generation and transmission circuitry 941 may be configured to generate and transmit an uplink control channel (e.g., a Physical Uplink Control Channel (PUCCH)). In some examples, the UL traffic and control channel generation and transmission circuitry 941 may be configured to detect the presence of user data traffic in an uplink buffer (e.g., data buffer 915) and to generate and transmit a dynamic scheduling request to a scheduling entity to request uplink resources (e.g., a set of one or more uplink resource elements) for transmitting the user data traffic to the scheduling entity. The UL traffic and control channel generation and transmission circuitry 941 may further be configured to generate and transmit a request for an SPS uplink grant for low-latency and/or periodic transmissions.

The UL traffic and control channel generation and transmission circuitry 941 may further be configured to generate and transmit uplink user data traffic on an UL traffic channel (e.g., a PUSCH) in accordance with an uplink grant. In some examples, the scheduled entity 900 may be configured with multiple uplink grants of different types and the UL traffic and control channel generation and transmission circuitry 941 may utilize the respective allocated resources for each uplink grant to transmit uplink user data traffic in accordance with each of the uplink grants. For example, the multiple uplink grants may include a dynamic uplink grant, a dedicated SPS uplink grant and a contention-based SPS uplink grant. The UL traffic and control channel generation and transmission circuitry 941 may operate in coordination with UL traffic and control channel generation and transmission software 951.

The processor 904 may further include downlink (DL) traffic and control channel reception and processing circuitry 942, configured for receiving and processing downlink user data traffic on a traffic channel, and to receive and process control information on one or more downlink control channels. For example, the DL traffic and control channel reception and processing circuitry 942 may be configured to receive downlink control information (DCI) (e.g., within a PDCCH) including one or more uplink grants, where each uplink grant may be a different grant type (e.g., contention-based SPS, dedicated SPS and/or dynamic). The DL traffic and control channel reception and processing circuitry 942 may then provide the scheduling information associated with each uplink grant to the UL traffic and control channel generation and transmission circuitry 941 for use in transmitting uplink user data traffic to the scheduling entity. The DL traffic and control channel reception and processing circuitry 942 may operate in coordination with DL traffic and control channel reception and processing software 952.

The processor 904 may further include uplink grant management circuitry 943, configured to manage multiple uplink grants for the scheduled entity 900. In some examples, the multiple uplink grants may include one or more dedicated SPS uplink grants, one or more contention-based SPS uplink grants and a dynamic uplink grant. In some examples, if the set of resource elements allocated for the dynamic uplink grant overlaps one or more of the SPS uplink grants (e.g., in time or time and frequency), the uplink grant management circuitry 943 may be configured to prioritize the dynamic uplink grant over any of the SPS uplink grants. Thus, the uplink grant management circuitry 943 may instruct the UL traffic and control channel generation and transmission circuitry 941 to transmit user data traffic associated with the dynamic uplink grant on the set of resource elements allocated to the dynamic uplink grant and to delay transmission of any SPS traffic until the next SPS transmission time.

In addition, if the set of resource elements allocated for a dedicated SPS uplink grant overlaps the set of resource elements allocated for a contention-based SPS uplink grant (e.g., in time or time and frequency), the uplink grant management circuitry 943 may be configured to prioritize the dedicated SPS uplink grant over the contention-based SPS uplink grant. Thus, the uplink grant management circuitry 943 may instruct the UL traffic and control channel generation and transmission circuitry 941 to transmit user data traffic associated with the dedicated SPS uplink grant on the set of resource elements allocated to the dedicated SPS uplink grant and to delay transmission of any user data traffic associated with the contention-based SPS uplink grant until the next contention-based SPS transmission time.

In some examples, the uplink grant management circuitry 943 may further be configured to select one of the uplink grants based on the user data traffic to be transmitted. For example, if the user data traffic is periodic, the uplink grant management circuitry 943 may select the dedicated SPS uplink grant for transmission of the user data traffic. For user data traffic with small packets or tight delay constraints (e.g., low-latency packets), the uplink grant management circuitry 943 may select the contention-based SPS uplink grant for transmission of the user data traffic. For user data traffic with larger sized packets, the uplink grant management circuitry 943 may select the dynamic uplink grant for transmission of the user data traffic.

The uplink grant management circuitry 943 may further be configured to provide different open-loop power control configurations for one or more of the uplink grants. In some examples, the open-loop power control configuration for the dynamic uplink grant may be different than the open-loop power control configuration for each of the SPS uplink grants. In some examples, the open-loop power control configurations for each SPS uplink grant type may also differ. Thus, the uplink grant management circuitry 943 may be configured to control a power source 916 to provide a different uplink transmit power for transmissions associated with the dedicated SPS uplink grant than that used for transmissions associated with the contention-based SPS uplink grant. The uplink grant management circuitry 943 may operate in coordination with uplink grant management software 953.

Figure 10:
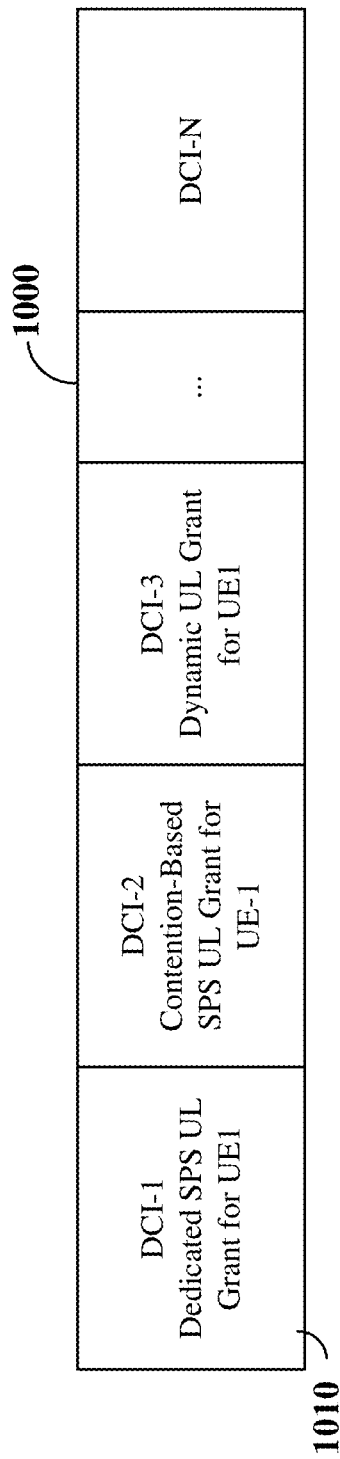
FIG. 10 is a diagram illustrating an example of a physical downlink control channel (PDCCH) carrying downlink control information according to some aspects of the present disclosure.

FIG. 10 is a diagram illustrating an example of a physical downlink control channel (PDCCH) 1000 carrying control information. As shown in FIG. 10, the PDCCH 1000 may include a plurality of downlink channel information (DCI) 1010 (e.g., DCI-1 ... DCI-N). Each DCI 1010 may include scheduling assignments (e.g., downlink assignments and/or uplink grants) for one or more scheduled entities.

In the example shown in FIG. 10, the PDCCH 1000 includes multiple DCIs 1010 for a single UE (e.g., UE1). For example, DCI-1 may include a dedicated SPS uplink grant for UE1, DCI-2 may include a contention-based SPS uplink grant for UE1, and DCI-3 may include a dynamic uplink grant for UE1. Thus, DCI-1, DCI-2, and DCI-3 may each include respective scheduling information indicating a set of one or more resource elements (e.g., time-frequency resources) allocated for the uplink grants. In addition, DCI-1 and DCI-2 may each further include respective SPS configuration parameters for the SPS uplink grants. Additional DCI 1010 within the PDCCH 1000 or a subsequent PDCCH may include an activation for each of the SPS uplink grants to enable UE1 to begin to utilize the SPS uplink grants based on the SPS configuration parameters for each of the SPS uplink grants. To deactivate/release either of the SPS uplink grants, a subsequent PDCCH may include DCI that include an explicit deactivation/release of the SPS uplink grant.

Although multiple uplink grants are illustrated in FIG. 10 as being included within a single PDCCH, it should be understood that the different uplink grants for UE1 may be included in two or more PDCCH. For example, the SPS grants may be included in one PDCCH, while the dynamic grant is included in another PDCCH. In addition, each of the SPS uplink grants may be included in a separate PDCCH.

Figure 11:
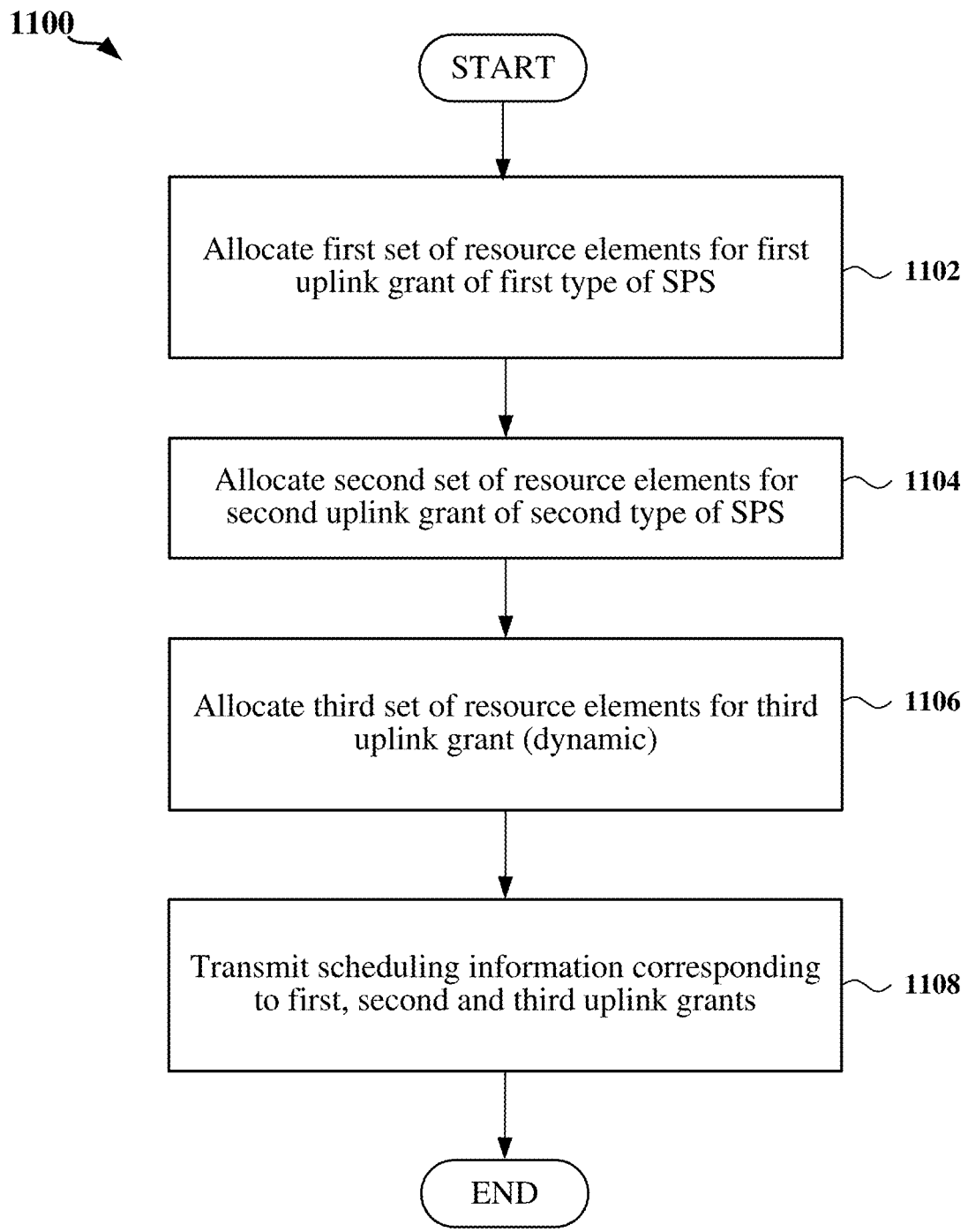
FIG. 11 is a flow chart of a method of simultaneously scheduling multiple uplink grants for a scheduled entity in a wireless communication network according to some aspects of the present disclosure.

FIG. 11 is a flow chart illustrating an exemplary process 1100 for simultaneously scheduling multiple uplink grants for a scheduled entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity illustrated in FIG. 8. In some examples, the process 1100 may be carried out by any suitable apparatus or means for carrying out the functions or algorithm described below.

At block 1102, the scheduling entity may allocate a first set of resource elements for use by a scheduled entity in accordance with a first uplink grant of a first type of semi-persistent scheduling (SPS). For example, the scheduling entity may allocate a first set of resource elements for a dedicated SPS uplink grant. At block 1104, the scheduling entity may allocate a second set of resource elements for use by the scheduled entity in accordance with a second uplink grant of a second type of semi-persistent scheduling (SPS). For example, the scheduling entity may allocate a second set of resource elements for a contention-based SPS uplink grant. For example, the resource assignment and scheduling circuitry 841 shown and described above in reference to FIG. 8 may allocate the first and second sets of resource elements for the first and second uplink grants.

At block 1106, the scheduling entity may allocate a third set of resource elements for use by the scheduled entity in accordance with a third uplink grant, where the third uplink grant is a dynamic scheduling grant. The dynamic scheduling grant may be provided, for example, in response to receiving a scheduling request from the scheduled entity. For example, the resource assignment and scheduling circuitry 841 shown and described above in reference to FIG. 8 may allocate the third set of resource elements for the third uplink grant.

At block 1108, the scheduling entity may transmit scheduling information corresponding to each of the uplink grants to the scheduled entity. In some examples, the scheduling entity may transmit SPS configuration parameters containing the scheduling information for each of the SPS uplink grants within respective DCI of one or more PDCCH. The scheduling entity may further transmit the scheduling information indicating the allocated set of resource elements for the dynamic scheduling grant within DCI of a PDCCH. The PDCCH carrying the dynamic scheduling information may be the same PDCCH that includes one or both of the SPS uplink grants or a subsequent PDCCH. In general, the dynamic scheduling information may be transmitted to the scheduled entity together with the SPS configuration parameters for one or both of the SPS uplink grants or after the SPS configuration parameters for both of the SPS uplink grants, but prior to deactivation/release of either SPS uplink grant. Thus, the scheduled entity may be simultaneously configured with a dedicated SPS uplink grant, a contention-based SPS uplink grant and a dynamic uplink grant. For example, the DL traffic and control channel generation and transmission circuitry 842 and transceiver 810 shown and described above in reference to FIG. 8 may transmit the scheduling information corresponding to each of the first, second, and third uplink grants to the scheduled entity.

Figure 12:
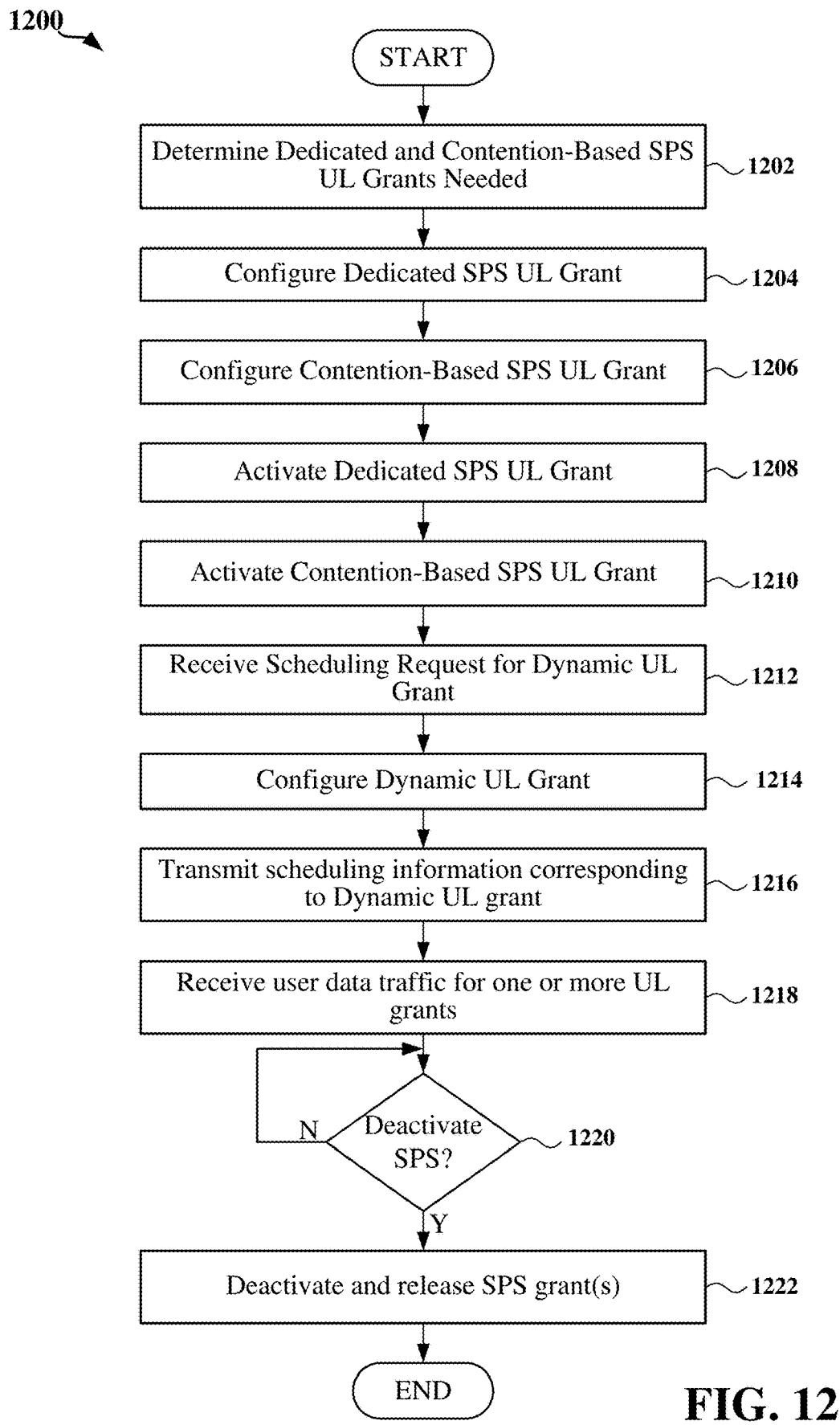
FIG. 12 is a flow chart of another method of simultaneously scheduling multiple uplink grants for a scheduled entity in a wireless communication network according to some aspects of the present disclosure.

FIG. 12 is a flow chart illustrating another exemplary process 1200 for simultaneously scheduling multiple uplink grants for a scheduled entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity illustrated in FIG. 8. In some examples, the process 1200 may be carried out by any suitable apparatus or means for carrying out the functions or algorithm described below.

At block 1202, the scheduling entity may determine that a dedicated SPS uplink grant and a contention-based SPS uplink grant are needed for a scheduled entity. In some examples, the scheduling entity may determine that both a dedicated SPS uplink grant and a contention-based SPS uplink grant are needed for a scheduled entity based on the Quality of Service (QoS) to be provided to the scheduled entity and/or a type of traffic to be sent by the scheduling entity. For example, to support periodic uplink transmissions, the scheduling entity may determine that a dedicated SPS uplink grant is needed for the scheduled entity. As another example, to support random packet arrival, with small packet size and/or tight delay constraints, the scheduling entity may determine that a contention-based SPS uplink grant is needed for the scheduled entity and other scheduled entities. For example, the resource assignment and scheduling circuitry 841 shown and described above in reference to FIG. 8 may determine that both dedicated and contention-based SPS uplink grants are needed for a scheduled entity.

At block 1204, the scheduling entity may configure the dedicated SPS uplink grant and transmit scheduling information containing SPS configuration parameters for the dedicated SPS uplink grant to the scheduled entity. At block 1206, the scheduling entity may configure the contention-based SPS uplink grant and transmit scheduling information containing SPS configuration parameters for the contention-based SPS uplink grant to the scheduled entity. SPS configuration messages including the scheduling information for each of the dedicated and contention-based SPS uplink grants may be transmitted, for example, via the PDCCH within a DL burst of a DL-centric slot or an UL-centric slot. The two SPS uplink grants may be configured at the same time or at different times, depending on the service requirements of the scheduled entity. In some examples, the SPS configuration parameters for each SPS uplink grant may include an indication of the allocated resources (e.g., set of one or more resource elements) for the SPS uplink grant, a semi-persistent scheduling identifier (e.g., an SPS-RNTI) for the scheduled entity and a periodicity of the SPS uplink grant. Additional SPS configuration parameters may also include, but are not limited to, an implicit release time, cyclic shift DMRS configuration, modulation and coding scheme (MCS) and/or other parameters.

In some examples, the SPS configuration parameters for each of the SPS uplink grants are different (e.g., at least one of the parameters has a different value in each of the SPS uplink grants). For example, the set of resource elements allocated to the first SPS uplink grant may be orthogonal to the set of resource elements allocated to second SPS uplink grant (e.g., the resource elements may be configured in a time division multiplexed (TDM) manner). However, in other examples, one or more of the SPS configuration parameters may be the same between the two SPS uplink grants. For example, the set of resource elements allocated to the first SPS uplink grant may be partially or completely overlapping the set of resource elements allocated to the second SPS grant. In addition, one or more of the MCS, cyclic shift DMRS, implicit release time and periodicity assigned to each of the SPS uplink grants may be the same or different. For example, the resource assignment and scheduling circuitry 841 shown and described above in reference to FIG. 8 may configure the dedicated and contention-based SPS uplink grants for the scheduled entity.

At block 1208, the scheduling entity may activate the dedicated SPS uplink grant. At block 1210, the scheduling entity may activate the contention-based SPS uplink grant. In some examples, the scheduling entity may transmit a respective SPS activation message scrambled with the SPS-RNTI to the scheduled entity to activate each of the dedicated and contention-based SPS uplink grants and enable the scheduled entity to utilize the SPS uplink grants based on the SPS configuration parameters. The SPS activation messages may be transmitted, for example, via the PDCCH within a DL burst of a DL-centric slot or an UL-centric slot. The dedicated and contention-based SPS uplink grants may be activated at the same time or at different times. For example, the DL traffic and control channel generation and transmission circuitry 842 may activate the dedicated and contention-based SPS uplink grants for the scheduled entity.

At block 1212, the scheduling entity may receive a scheduling request for a dynamic uplink grant from the scheduled entity. The scheduling request may be transmitted, for example, via the PUCCH within an UL burst of a DL-centric slot or an UL-centric slot. For example, the UL traffic and control channel reception and processing circuitry 843 shown and described above in reference to FIG. 8 may receive the scheduling request from the scheduled entity. In addition, although FIG. 12 illustrates the scheduling entity receiving the scheduling request after configuration and activation of the SPS uplink grants, in other examples, the scheduling entity may receive the scheduling request prior to configuration and/or activation of the SPS uplink grants.

In response to the scheduling request, at block 1214, the scheduling entity may configure the dynamic uplink grant by allocating resource elements to the scheduled entity for the dynamic uplink grant. For example, the resource assignment and scheduling circuitry 841 shown and described above in reference to FIG. 8 may configure the dynamic uplink grant.

At block 1216, the scheduling entity may transmit scheduling information corresponding to the dynamic uplink grant (e.g., information indicative of the assigned resource elements) to the scheduled entity. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. For example, the DL traffic and control channel generation and transmission circuitry 842 and transceiver 810 may transmit the scheduling information corresponding to the dynamic uplink grant to the scheduled entity. In addition, although FIG. 12 illustrates the scheduling entity transmitting the dynamic uplink grant scheduling information to the scheduled entity after configuration and activation of the SPS uplink grants, in other examples, the scheduling entity may transmit the dynamic uplink grant scheduling information simultaneous to the SPS configuration messages and/or the SPS activation messages.

At block 1218, the scheduling entity may receive user data traffic from the scheduled entity for one or more of the uplink grants. For example, the scheduling entity may receive user data traffic on the resource elements allocated to the dedicated SPS uplink grant, the contention-based SPS uplink grant and/or the dynamic uplink grant. For example, the UL traffic and control channel reception and processing circuitry 843 may receive the user data traffic from the scheduled entity.

At block 1220, the scheduling entity may determine whether to deactivate and release one or both of the SPS uplink grants. If one or both of the SPS uplink grants is to be activated and released (Y branch of block 1220), at block 1222, the scheduling entity deactivates and releases one or both of the SPS uplink grants. For example, during periods of silence or when a data transfer is complete for a particular one of the SPS uplink grants, that particular SPS uplink grant may be deactivated/released. In some examples, an explicit deactivation/release message may be transmitted from the scheduling entity to the scheduled entity. For example, to deactivate/release either of the SPS uplink grants, a subsequent PDCCH may include DCI that include an explicit deactivation/release of the SPS uplink grant. In other examples, the scheduled entity may initiate an inactivity timer with the implicit release time received as part of the SPS configuration parameters for a particular SPS uplink grant, and when the inactivity timer expires, the scheduled entity may release the SPS uplink resources to the scheduling entity. The dedicated and contention-based SPS uplink grants may be deactivated/released at the same time or at different times. For example, the resource assignment and scheduling circuitry 841 may deactivate and release one or both of the SPS uplink grants.

Figure 13:
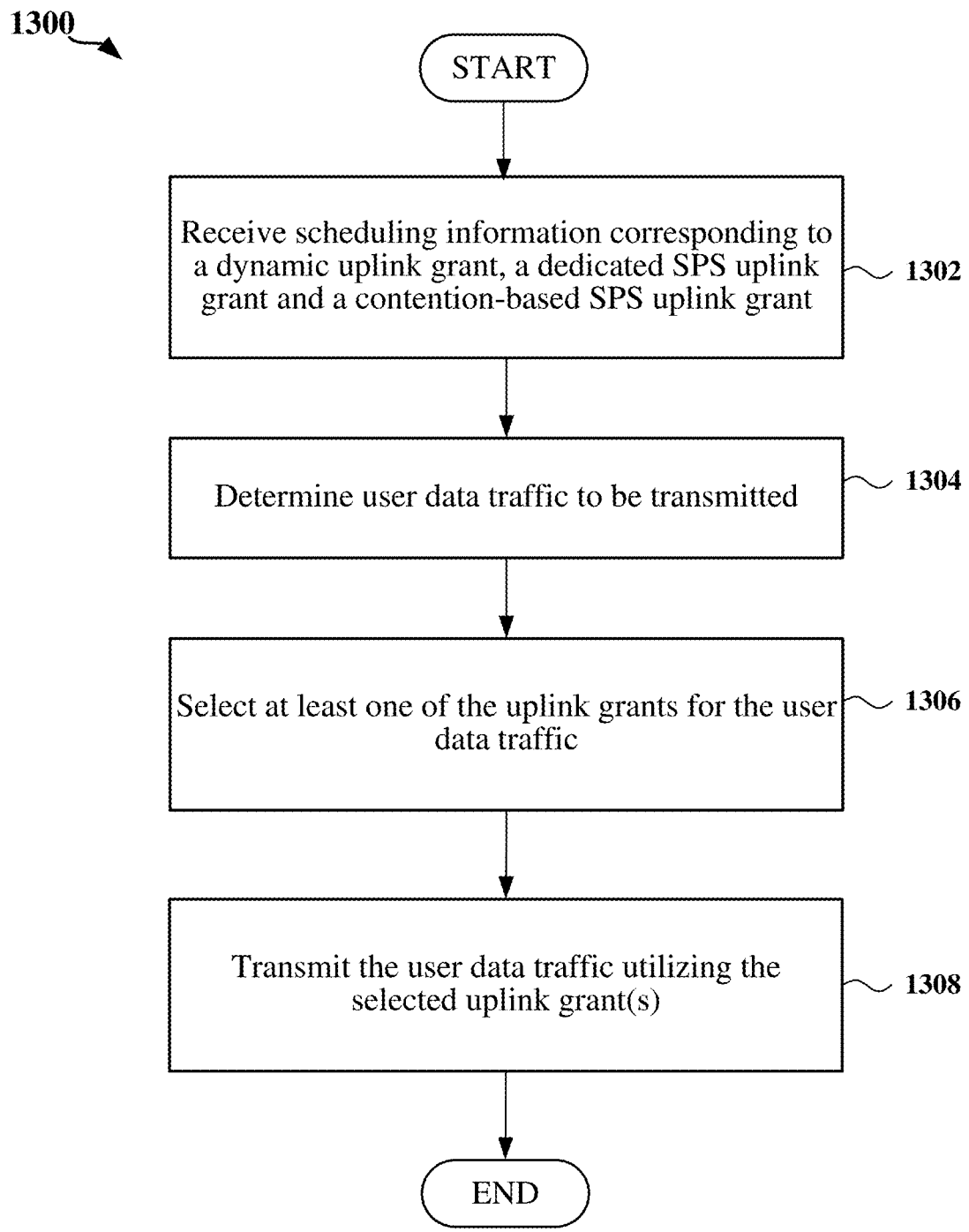
FIG. 13 is a flow chart of a method of selecting between multiple uplink grants simultaneously configured for a scheduling entity in a wireless communication network according to some aspects of the present disclosure.

FIG. 13 is a flow chart illustrating another exemplary process 1300 for selecting between multiple uplink grants simultaneously configured for a scheduled entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity illustrated in FIG. 9. In some examples, the process 1300 may be carried out by any suitable apparatus or means for carrying out the functions or algorithm described below.

At block 1302, the scheduled entity may receive scheduling information corresponding to a dynamic uplink grant, a dedicated SPS uplink grant and a contention-based SPS uplink grant to simultaneously configure the scheduled entity with a dedicated SPS uplink grant, a contention-based SPS uplink grant and a dynamic uplink grant. In some examples, the scheduling information for each of the uplink grants (e.g., dynamic, dedicated SPS, and contention-based SPS) may be received within separate downlink control information (DCI) of a single physical downlink control channel (PDCCH). In other examples, the scheduling information for the dynamic uplink grant may be received subsequent to the scheduling information for at least one of the SPS uplink grants. For example, the scheduling information for one of the SPS uplink grants may be received in the DCI of an initial PDCCH, while the scheduling information for the other SPS uplink grant and the dynamic uplink grant may be received in the DCI of one or more subsequent PDCCHs. For example, the DL traffic and control channel reception and processing circuitry 942 shown and described above in reference to FIG. 9 may receive the scheduling information for each of the dedicated SPS uplink grant, the contention-based SPS uplink grant, and the dynamic uplink grant.

At block 1304, the scheduled entity may determine that there is user data traffic to be transmitted to the scheduling entity, and at block 1306, select at least one of the uplink grants for transmission of the user data traffic to the scheduling entity. For example, the scheduled entity may detect the presence of user data traffic in an uplink buffer and select one or more of the uplink grants to transmit the user data traffic to the scheduling entity. For example, the UL grant management circuitry 943 and UL traffic and control channel generation and transmission circuitry 941 shown and described above in reference to FIG. 9 may detect the presence of user data traffic to be transmitted and select one or more of the uplink grants to transmit the user data traffic to the scheduling entity. At block 1308, the scheduled entity may transmit the user data traffic to the scheduling entity utilizing the selected uplink grant(s). For example, the UL traffic and control channel generation and transmission circuitry 941 shown and described above in reference to FIG. 9 may transmit the user data traffic to the scheduling entity utilizing the selected uplink grant(s) via the PUSCH.

Figure 14:
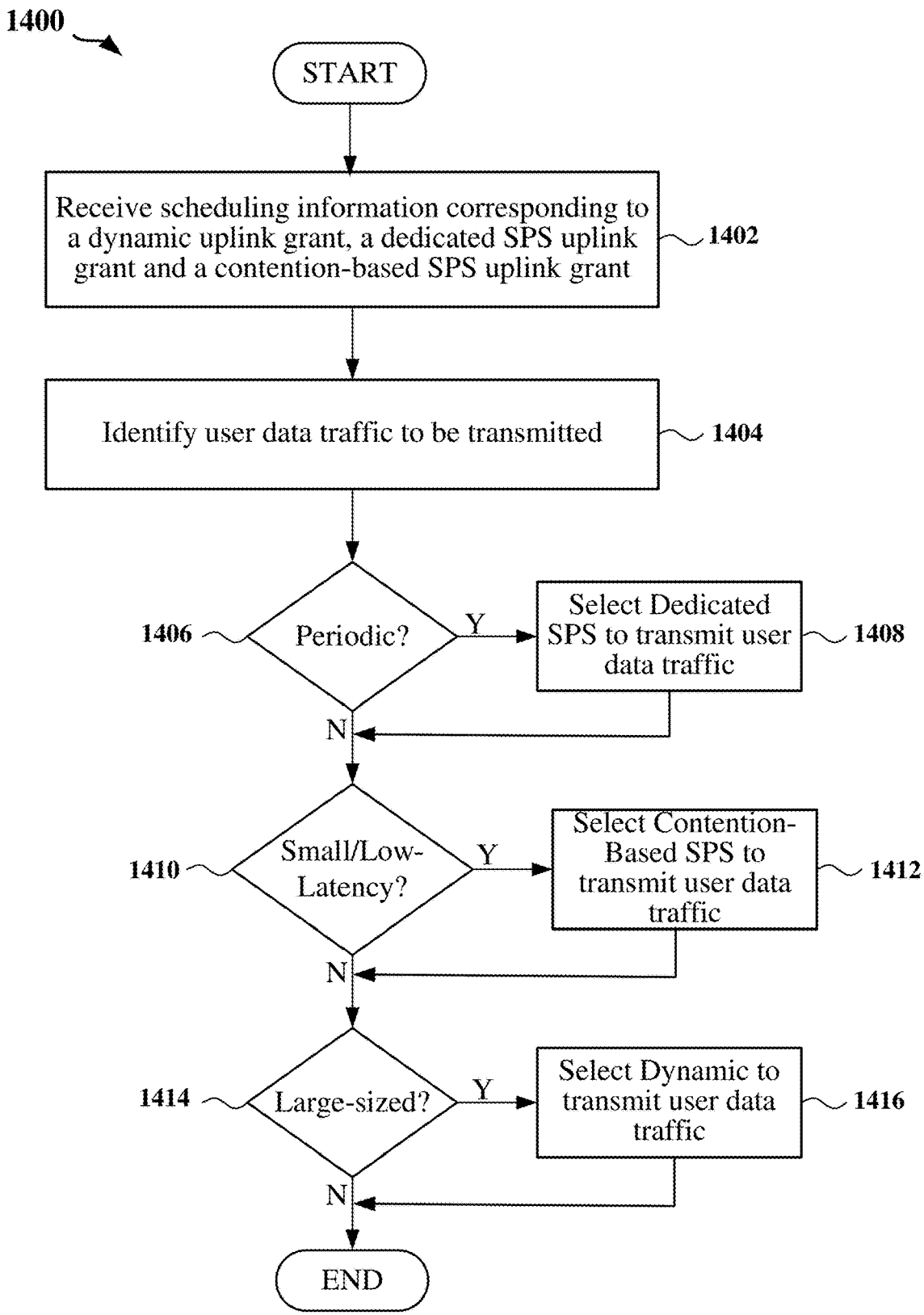
FIG. 14 is a flow chart of another method of selecting between multiple uplink grants simultaneously configured for a scheduling entity in a wireless communication network according to some aspects of the present disclosure.

FIG. 14 is a flow chart illustrating another exemplary process 1400 for selecting between multiple uplink grants simultaneously configured for a scheduled entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduled entity illustrated in FIG. 9. In some examples, the process 1400 may be carried out by any suitable apparatus or means for carrying out the functions or algorithm described below.

At block 1402, the scheduled entity may receive scheduling information corresponding to a dynamic uplink grant, a dedicated SPS uplink grant and a contention-based SPS uplink grant to simultaneously configure the scheduled entity with a dedicated SPS uplink grant, a contention-based SPS uplink grant and a dynamic uplink grant. In some examples, the scheduling information for each of the uplink grants (e.g., dynamic, dedicated SPS, and contention-based SPS) may be received within separate downlink control information (DCI) of a single physical downlink control channel (PDCCH). In other examples, the scheduling information for the dynamic uplink grant may be received subsequent to the scheduling information for at least one of the SPS uplink grants. For example, the scheduling information for one of the SPS uplink grants may be received in the DCI of an initial PDCCH, while the scheduling information for the other SPS uplink grant and the dynamic uplink grant may be received in the DCI of one or more subsequent PDCCHs. For example, the DL traffic and control channel reception and processing circuitry 942 shown and described above in reference to FIG. 9 may receive the scheduling information for each of the dedicated SPS uplink grant, the contention-based SPS uplink grant, and the dynamic uplink grant.

At block 1404, the scheduled entity may determine that there is user data traffic to be transmitted to the scheduling entity, and identify a traffic type of the user data traffic. In some examples, the type of traffic may include one or more of periodic traffic, small packet-sized and/or low-latency traffic, or large packet-sized traffic. For example, the UL grant management circuitry 943 shown and described above in reference to FIG. 9 may identify the type of traffic to be transmitted to the scheduling entity.

At block 1406, the scheduled entity may determine whether the user data traffic includes periodic traffic. If the user data traffic includes periodic traffic (Y branch of block 1406), at block 1408, the scheduled entity may select the dedicated SPS uplink grant for transmission of the periodic user data traffic. At block 1410, the scheduled entity then determines whether the user data traffic includes small packet-sized and/or low-latency traffic. If the user data traffic includes small packet-sized and/or low-latency traffic (Y branch of block 1410), at block 1412, the scheduled entity may select the contention-based SPS uplink grant for transmission of the small packet-sized and/or low-latency user data traffic. At block 1414, the scheduled entity then determines whether the user data traffic includes large packet-sized traffic. If the user data traffic includes large packet-sized traffic, the scheduled entity may select the dynamic uplink grant for transmission of the large packet-sized user data traffic. For example, the UL grant management circuitry 943 shown and described above in reference to FIG. 9 may select between the dedicated SPS uplink grant, contention-based SPS uplink grant and dynamic uplink grant based on the traffic type(s) of the user data traffic to be transmitted.

Figure 15:
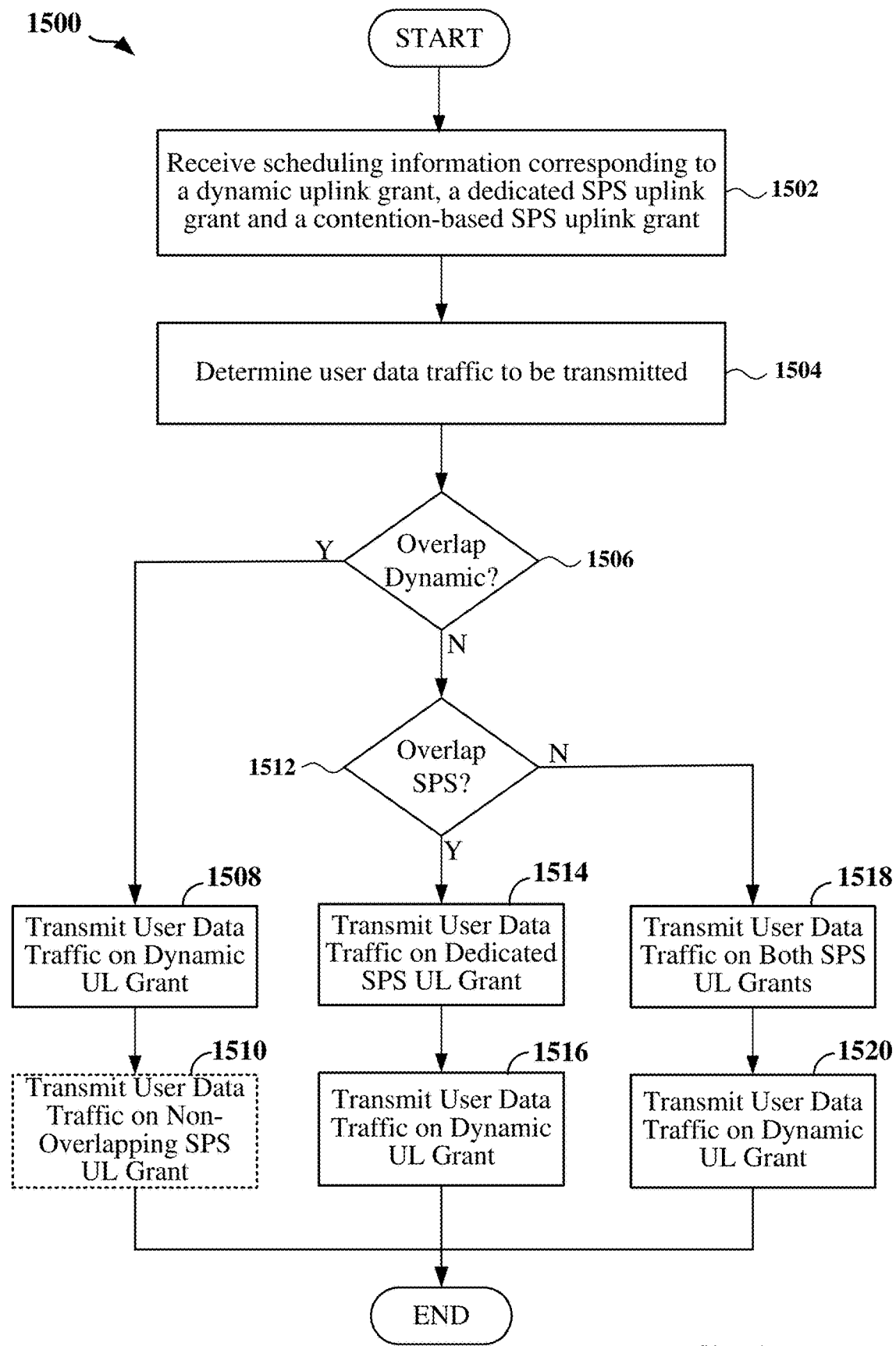
FIG. 15 is a flow chart is a flow chart of another method of selecting between multiple uplink grants simultaneously configured for a scheduling entity in a wireless communication network according to some aspects of the present disclosure.

FIG. 15 is a flow chart illustrating another exemplary process 1500 for selecting between multiple uplink grants simultaneously configured for a scheduled entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity illustrated in FIG. 9. In some examples, the process 1500 may be carried out by any suitable apparatus or means for carrying out the functions or algorithm described below.

At block 1502, the scheduled entity may receive scheduling information corresponding to a dynamic uplink grant, a dedicated SPS uplink grant and a contention-based SPS uplink grant to simultaneously configure the scheduled entity with a dedicated SPS uplink grant, a contention-based SPS uplink grant and a dynamic uplink grant. In some examples, the scheduling information for each of the uplink grants (e.g., dynamic, dedicated SPS, and contention-based SPS) may be received within separate downlink control information (DCI) of a single physical downlink control channel (PDCCH). In other examples, the scheduling information for the dynamic uplink grant may be received subsequent to the scheduling information for at least one of the SPS uplink grants. For example, the scheduling information for one of the SPS uplink grants may be received in the DCI of an initial PDCCH, while the scheduling information for the other SPS uplink grant and the dynamic uplink grant may be received in the DCI of one or more subsequent PDCCHs. For example, the DL traffic and control channel reception and processing circuitry 942 shown and described above in reference to FIG. 9 may receive the scheduling information for each of the dedicated SPS uplink grant, the contention-based SPS uplink grant, and the dynamic uplink grant.

At block 1504, the scheduled entity may determine that there is user data traffic to be transmitted to the scheduling entity for each of the uplink grants. For example, the UL traffic and control channel generation and transmission circuitry 941 and UL grant management circuitry 943 shown and described above in reference to FIG. 9 may determine that there is uplink user data traffic for each of the uplink grants (e.g., dedicated SPS, contention-based SPS and dynamic) to be transmitted to the scheduling entity.

At block 1506, the scheduled entity may determine whether the set of resource elements allocated to the dynamic uplink grant overlaps the respective sets of resource elements allocated to one or both of the SPS uplink grants in time or in time and frequency. If the set of resource elements allocated to the dynamic uplink grant overlaps the set of resource elements allocated to the dedicated SPS uplink grant and/or the set of resource elements allocated to the contention-based SPS uplink grant (Y branch of block 1506), at block 1508, the scheduled entity may prioritize the dynamic uplink grant over any of the SPS uplink grants and transmit user data traffic associated with the dynamic uplink grant on the set of resource elements allocated to the dynamic uplink grant. At block 1510, the scheduled entity may further transmit user data traffic associated with a non-overlapping SPS grant on the set of resource elements allocated to the non-overlapping SPS grant. If the set of resource elements allocated to each of the SPS grants overlaps the set of resource elements allocated to the dynamic uplink grant, block 1510 may not be performed. The scheduling entity may further delay transmission of any overlapping SPS traffic until the next SPS transmission time. For example, the UL grant management circuitry 943 and UL traffic and control channel generation and transmission circuitry 941 shown and described above in reference to FIG. 9 may determine whether there is resource overlap between the dynamic uplink grant and either one or both of the SPS uplink grants and prioritize the dynamic uplink grant over the overlapping SPS uplink grant(s).

If the set of resource elements allocated to the dynamic uplink grant does not overlap the respective set of resource elements allocated to either the dedicated SPS uplink grant or the contention-based SPS uplink grant (N branch of block 1506), at block 1512, the scheduled entity may determine whether the set of resource elements allocated to one of the SPS uplink grants overlaps the set of resource elements allocated to the other SPS uplink grant in time or in time and frequency. If the set of resource elements allocated to one of the SPS uplink grants overlaps the set of resource elements allocated to the other SPS uplink grant (Y branch of block 1512), at block 1514, the scheduled entity may prioritize the dedicated SPS uplink grant over the contention-based SPS uplink grant and transmit user data traffic associated with the dedicated SPS uplink grant on the set of resource elements allocated to the dedicated SPS uplink grant. The scheduled entity may further delay transmission of any user data traffic associated with the contention-based SPS uplink grant until the next contention-based SPS transmission time. At block 1516, the scheduled entity may further transmit the user data traffic associated with the dynamic uplink grant on the set of resource elements allocated to the dynamic uplink grant. For example, the UL grant management circuitry 943 and UL traffic and control channel generation and transmission circuitry 941 shown and described above in reference to FIG. 9 may determine whether there is resource overlap between the SPS uplink grants and prioritize the dedicated SPS uplink grant over the overlapping contention-based SPS uplink grant.

If the set of resource elements allocated to one of the SPS uplink grants does not overlap the set of resource elements allocated to the other SPS uplink grant (N branch of block 1512), at block 1518, the scheduled entity may transmit user data traffic associated with both the dedicated SPS uplink grant and the contention-based SPS uplink grant on the respective sets of resource elements allocated to the dedicated and contention-based SPS uplink grants. At block 1520, the scheduled entity may further transmit the user data traffic associated with the dynamic uplink grant on the set of resource elements allocated to the dynamic uplink grant. For example, the UL grant management circuitry 943 and UL traffic and control channel generation and transmission circuitry 941 shown and described above in reference to FIG. 9 may determine whether there is resource overlap between the SPS uplink grants and/or between the dynamic uplink grant and one or both of the SPS uplink grants, and if not, transmit the user data traffic on all three uplink grants.

Figure 16:
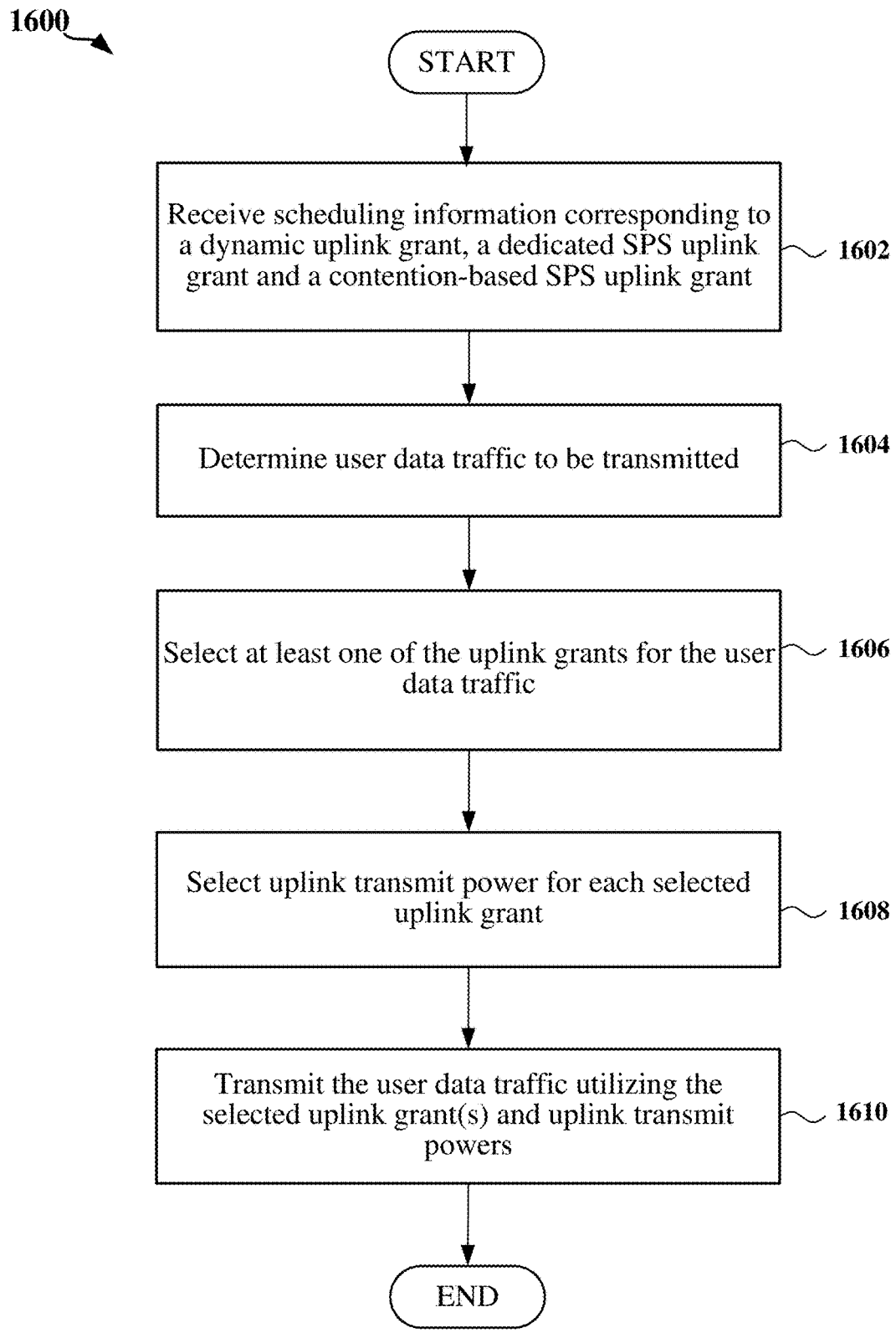
FIG. 16 is a flow chart of a method of utilizing different uplink transmit powers for different uplink grants simultaneously configured for a scheduling entity in a wireless communication network according to some aspects of the present disclosure.

FIG. 16 is a flow chart illustrating an exemplary process 1600 for utilizing different uplink transmit powers for different uplink grants simultaneously configured for a scheduling entity in a wireless communication network according to some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity illustrated in FIG. 9. In some examples, the process 1600 may be carried out by any suitable apparatus or means for carrying out the functions or algorithm described below.

At block 1602, the scheduled entity may receive scheduling information corresponding to a dynamic uplink grant, a dedicated SPS uplink grant and a contention-based SPS uplink grant to simultaneously configure the scheduled entity with a dedicated SPS uplink grant, a contention-based SPS uplink grant and a dynamic uplink grant. In some examples, the scheduling information for each of the uplink grants (e.g., dynamic, dedicated SPS, and contention-based SPS) may be received within separate downlink control information (DCI) of a single physical downlink control channel (PDCCH). In other examples, the scheduling information for the dynamic uplink grant may be received subsequent to the scheduling information for at least one of the SPS uplink grants. For example, the scheduling information for one of the SPS uplink grants may be received in the DCI of an initial PDCCH, while the scheduling information for the other SPS uplink grant and the dynamic uplink grant may be received in the DCI of one or more subsequent PDCCHs. For example, the DL traffic and control channel reception and processing circuitry 942 shown and described above in reference to FIG. 9 may receive the scheduling information for each of the dedicated SPS uplink grant, the contention-based SPS uplink grant, and the dynamic uplink grant.

At block 1604, the scheduled entity may determine that there is user data traffic to be transmitted to the scheduling entity, and at block 1606, select at least one of the uplink grants for transmission of the user data traffic to the scheduling entity. For example, the scheduled entity may detect the presence of user data traffic in an uplink buffer and select one or more of the uplink grants to transmit the user data traffic to the scheduling entity. For example, the UL grant management circuitry 943 and UL traffic and control channel generation and transmission circuitry 941 shown and described above in reference to FIG. 9 may detect the presence of user data traffic to be transmitted and select one or more of the uplink grants to transmit the user data traffic to the scheduling entity.

At block 1608, the scheduled entity may select an uplink transmit power for each selected uplink grant. In some examples, the open-loop power control configuration for the dynamic uplink grant may be different than the open-loop power control configuration for each of the SPS uplink grants. In some examples, the open-loop power control configurations for each SPS uplink grant type may also differ. For example, the UL traffic and control channel generation and transmission circuitry 941 may be configured to control a power source 916 shown and described above in reference to FIG. 9 to provide different uplink transmit powers for transmissions associated with the dedicated SPS uplink grant, the contention-based SPS uplink grant and/or the dynamic uplink grant. At block 1610, the scheduled entity may transmit the user data traffic to the scheduling entity utilizing the selected uplink grant(s) and the selected uplink transmit power(s) for each of the selected uplink grant(s). For example, the UL traffic and control channel generation and transmission circuitry 941 shown and described above in reference to FIG. 9 may transmit the user data traffic to the scheduling entity utilizing the selected uplink grant(s) via the PUSCH.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2 and/or 6-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network for a scheduling entity to communicate with a set of one or more scheduled entities, the method comprising:
    configuring a first type of semi-persistent scheduling with first semi-persistent scheduling parameters comprising a first set of resource elements for use by a scheduled entity of the set of one or more scheduled entities in accordance with a first uplink grant;
    configuring a second type of semi-persistent scheduling with second semi-persistent scheduling parameters comprising a second set of resource elements for use by the scheduled entity in accordance with a second uplink grant;
    activating the first type of semi-persistent scheduling and the second type of semi-persistent scheduling for the scheduled entity; and
    allocating a third set of resource elements for use by the scheduled entity in accordance with a third uplink grant to simultaneously configure the scheduled entity with the first uplink grant, the second uplink grant, and the third uplink grant, wherein the third uplink grant comprises a dynamic scheduling grant, wherein at least two of the first set of resource elements, the second set of resource elements, or the third set of resource elements at least partially overlaps.

2. The method of claim 1, wherein the first type of semi-persistent scheduling comprises dedicated semi-persistent scheduling and the second type of semi-persistent scheduling comprises contention-based semi-persistent scheduling.

3. The method of claim 1, wherein:
    the first semi-persistent scheduling configuration parameters further comprise at least a first semi-persistent scheduling identifier and a first periodicity of the first uplink grant;
    the second semi-persistent scheduling configuration parameters further comprise at least a second semi-persistent scheduling identifier and a second periodicity of the second uplink grant.

4. The method of claim 1, wherein activating the first type of semi-persistent scheduling for the scheduled entity is performed substantially simultaneously to activating the second type of semi-persistent scheduling for the scheduling entity.

5. The method of claim 1, wherein activating the first type of semi-persistent scheduling for the scheduled entity and activating the second type of semi-persistent scheduling for the scheduled entity are performed at different times.

6. The method of claim 1, further comprising:
    releasing the first type of semi-persistent scheduling for the scheduled entity to deactivate the first uplink grant; and
    releasing the second type of semi-persistent scheduling for the scheduled entity to deactivate the second uplink grant.

7. The method of claim 6, wherein releasing the first type of semi-persistent scheduling for the scheduled entity is performed substantially simultaneously to releasing the second type of semi-persistent scheduling for the scheduling entity.

8. The method of claim 6, wherein releasing the first type of semi-persistent scheduling for the scheduled entity and releasing the second type of semi-persistent scheduling for the scheduling entity are performed at different times.

9. The method of claim 1, further comprising:
    configuring at least one of the first uplink grant or the second uplink grant based on a traffic type of user data traffic to be sent by the scheduled entity.

10. The method of claim 1, further comprising:
    configuring at least one of the first uplink grant or the second uplink grant based on a quality of service to be provided to the scheduled entity.

11. The method of claim 1, wherein the first set of resource elements are orthogonal to the second set of resource elements.

12. The method of claim 1, wherein the first set of resource elements at least partially overlaps the second set of resource elements.

13. The method of claim 1, further comprising:
    transmitting a physical downlink control channel comprising separate downlink channel information for each of the first uplink grant, the second uplink grant and the third uplink grant, wherein each of the downlink channel information comprises respective scheduling information, the respective scheduling information comprises first semi-persistent scheduling configuration parameters, the second semi-persistent scheduling configuration parameters, and the third set of resource elements.

14. The method of claim 1, wherein the scheduling entity comprises a base station and the scheduled entity comprises a user equipment, and further comprising:
    receiving user data traffic from the user equipment on at least one of the first set of resource elements, the second set of resource elements or the third set of resource elements.

15. A scheduling entity in a wireless communication network, comprising:
    a processor;
    a transceiver communicatively coupled to the processor; and
    a memory communicatively coupled to the processor, wherein the processor is configured to:
        configure a first type of semi-persistent scheduling with first semi-persistent scheduling parameters comprising a first set of resource elements for use by a scheduled entity of a set of one or more scheduled entities in accordance with a first uplink grant;
        configure a second type of semi-persistent scheduling with second semi-persistent scheduling parameters comprising a second set of resource elements for use by the scheduled entity in accordance with a second uplink grant;
        activate the first type of semi-persistent scheduling and the second type of semi-persistent scheduling for the scheduled entity; and
        allocate a third set of resource elements for use by the scheduled entity in accordance with a third uplink grant to simultaneously configure the scheduled entity with the first uplink grant, the second uplink grant, and the third uplink grant, wherein the third uplink grant comprises a dynamic scheduling grant, wherein at least two of the first set of resource elements, the second set of resource elements, or the third set of resource elements at least partially overlaps.

16. The scheduling entity of claim 15, wherein the first type of semi-persistent scheduling comprises dedicated semi-persistent scheduling and the second type of semi-persistent scheduling comprises contention-based semi-persistent scheduling.

17. The scheduling entity of claim 16, wherein the processor is further configured to:
configure at least one of the first uplink grant or the second uplink grant based on a type of traffic to be sent by the scheduled entity.

18. The scheduling entity of claim 15, wherein the first set of resource elements are orthogonal to the second set of resource elements.

19. The scheduling entity of claim 15, wherein the first set of resource elements at least partially overlaps the second set of resource elements.

20. The scheduling entity of claim 15, wherein the processor is further configured to:
receive traffic from the scheduled entity on at least one of the first set of resource elements, the second set of resource elements or the third set of resource elements.

21. A method of wireless communication in a wireless communication network for a scheduled entity to communicate with a scheduling entity, the method comprising:
receiving scheduling information corresponding to a first uplink grant, a second uplink grant, and a third uplink grant to simultaneously configure the scheduled entity with the first uplink grant, the second uplink grant, and the third uplink grant, wherein the first uplink grant comprises a first type of semi-persistent scheduling, the second uplink grant comprises a second type of semi-persistent scheduling, and the third uplink grant comprises a dynamic scheduling grant, wherein the first uplink grant comprises a first set of resource elements, the second uplink grant comprises a second set of resource elements, and the third uplink grant comprises a third set of resource elements, wherein at least two of the first set of resource elements, the second set of resource elements, or the third set of resource elements at least partially overlaps;
receiving a respective activation for each of the first type of semi-persistent scheduling and the second type of semi-persistent scheduling;
identifying user data traffic to be transmitted from the scheduled entity to the scheduling entity;
selecting one or more selected uplink grants from the first uplink grant, the second uplink, or the third uplink grant for the user data traffic; and
transmitting the user data traffic from the scheduled entity to the scheduling entity utilizing the one or more selected uplink grants.

22. The method of claim 21, wherein the first type of semi-persistent scheduling comprises dedicated semi-persistent scheduling and the second type of semi-persistent scheduling comprises contention-based semi-persistent scheduling.

23. The method of claim 22, wherein selecting the one or more selected uplink grants further comprises:
selecting the one or more selected uplink grants based on a traffic type of the user data traffic.

24. The method of claim 23, wherein selecting the one or more selected uplink grants further comprises:

selecting the first uplink grant as one of the one or more selected uplink grants when the user data traffic comprises periodic traffic;
selecting the second uplink grant as one of the one or more selected uplink grants when the user data traffic comprises low-latency traffic or small packet-sized traffic; and
selecting the third uplink grant as one of the one or more selected uplink grants when the user data traffic comprises large packet-sized traffic.

25. The method of claim 21, wherein selecting the one or more selected uplink grants further comprises:
selecting the third uplink grant as one of the one or more selected uplink grants when the third set of resource elements overlaps at least one of the first set of resource elements or the second set of resource elements;
selecting the first uplink grant as one of the one or more selected uplink grants when the first set of resource elements overlaps the second set of resource elements and the first set of resource elements does not overlap the third set of resource elements; and
selecting the second uplink grant as one of the one or more selected uplink grants when the second set of resource elements does not overlap the first set of resource elements or the third set of resource elements.

26. The method of claim 21, further comprising:
selecting a respective uplink transmit power for each of the one or more selected uplink grants.

27. A scheduled entity in a wireless communication network, comprising:
a processor;
a transceiver communicatively coupled to the processor; and
a memory communicatively coupled to the processor, wherein the processor is configured to:
receive scheduling information corresponding to a first uplink grant, a second uplink grant, and a third uplink grant to simultaneously configure the scheduled entity with the first uplink grant, the second uplink grant, and the third uplink grant, wherein the first uplink grant comprises a dedicated semi-persistent scheduling grant, the second uplink grant comprises a contention-based semi-persistent scheduling grant, and the third uplink grant comprises a dynamic scheduling grant, wherein the first uplink grant comprises a first set of resource elements, the second uplink grant comprises a second set of resource elements, and the third uplink grant comprises a third set of resource elements, wherein at least two of the first set of resource elements, the second set of resource elements, or the third set of resource elements at least partially overlaps;
receive a respective activation for each of the first type of semi-persistent scheduling and the second type of semi-persistent scheduling;
identify user data traffic to be transmitted from the scheduled entity to a scheduling entity;
select one or more selected uplink grants from the first uplink grant, the second uplink, or the third uplink grant for the user data traffic; and
transmit the user data traffic from the scheduled entity to the scheduling entity via the transceiver utilizing the one or more selected uplink grants.

28. The scheduled entity of claim 27, wherein the processor is further configured to:
select the one or more selected uplink grants based on a traffic type of the user data traffic.

29. The scheduled entity of claim 27, wherein the processor is further configured to:
- select the third uplink grant as one of the one or more selected uplink grants when the third set of resource elements overlaps at least one of the first set of resource elements or the second set of resource elements;
- select the first uplink grant as one of the one or more selected uplink grants when the first set of resource elements overlaps the second set of resource elements and the first set of resource elements does not overlap the third set of resource elements; and
- select the second uplink grant as one of the one or more selected uplink grants when the second set of resource elements does not overlap the first set of resource elements or the third set of resource elements.

30. The scheduled entity of claim 27, wherein the processor is further configured to:
- select a respective uplink transmit power for each of the one or more selected uplink grants.

* * * * *